United States Patent
Hashizume et al.

(10) Patent No.: US 11,472,638 B2
(45) Date of Patent: Oct. 18, 2022

(54) CONVEYANCE APPARATUS, PRODUCTION SYSTEM, AND METHOD FOR MANUFACTURING ARTICLE

(71) Applicant: CANON KABUSHIKI KAISHA, Tokyo (JP)

(72) Inventors: Takuma Hashizume, Kanagawa (JP); Kosuke Katsuura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/146,797

(22) Filed: Jan. 12, 2021

(65) Prior Publication Data
US 2021/0245974 A1  Aug. 12, 2021

(30) Foreign Application Priority Data

Feb. 7, 2020  (JP) .............................. JP2020-019511
Dec. 8, 2020  (JP) .............................. JP2020-203785

(51) Int. Cl.
*B65G 54/02* (2006.01)
*B65G 43/00* (2006.01)

(52) U.S. Cl.
CPC ............. *B65G 54/02* (2013.01); *B65G 43/00* (2013.01); *B65G 2203/0283* (2013.01); *B65G 2203/042* (2013.01)

(58) Field of Classification Search
CPC .............. B65G 54/02; B65G 43/00; B65G 2203/0283; B65G 2203/042
USPC ........................................................ 198/805
See application file for complete search history.

(56) References Cited

U.S. PATENT DOCUMENTS 11,146,160 B2 * 10/2021 Frangen .................. H02P 6/006
11,196,329 B2 * 12/2021 Lu .............................. H02K 3/26

FOREIGN PATENT DOCUMENTS

| CN | 110054116 A | * | 7/2019 | |
| CN | 114026033 A | * | 2/2022 | ........... B65G 1/1371 |
| DE | 102016224951 A1 | * | 6/2018 | .............. B60L 13/06 |
| EP | 3883124 A1 | * | 9/2021 | |
| JP | H06105410 A | * | 9/1992 | |
| JP | 05-064315 A | | 3/1993 | |
| JP | 2006234697 A | * | 9/2006 | |

(Continued)

OTHER PUBLICATIONS

Tecnotion, Direct Drive in Motion, YouTube video, youtube.com/watch?v=0_QB16-_iJU, May 22, 2017, time 2:31 (Year: 2017).*

*Primary Examiner* — Gene O Crawford
*Assistant Examiner* — Lester Ill Rushin
(74) *Attorney, Agent, or Firm* — Canon U.S.A., Inc. I.P. Division

(57) ABSTRACT

A conveyance apparatus includes a mover, a stator, and a control unit. The mover moves along a first direction. The stator includes a plurality of first sensors arranged along the first direction. Each of the plurality of first sensors can detect position information about the mover. The control unit corrects the position information about the mover and controls a position and/or orientation of the mover based on at least one of a relative position between at least one of the plurality of first sensors and the mover. The relative position is obtained by (a) detection values of the plurality of first sensors and/or (b) detection times in which the plurality of first sensors each detect the position information about the mover.

18 Claims, 21 Drawing Sheets

(56) References Cited

FOREIGN PATENT DOCUMENTS

| JP | 021128096 A | * | 2/2020 | |
| WO | WO-2018169603 A1 | * | 9/2018 | ............. B65G 15/64 |

* cited by examiner

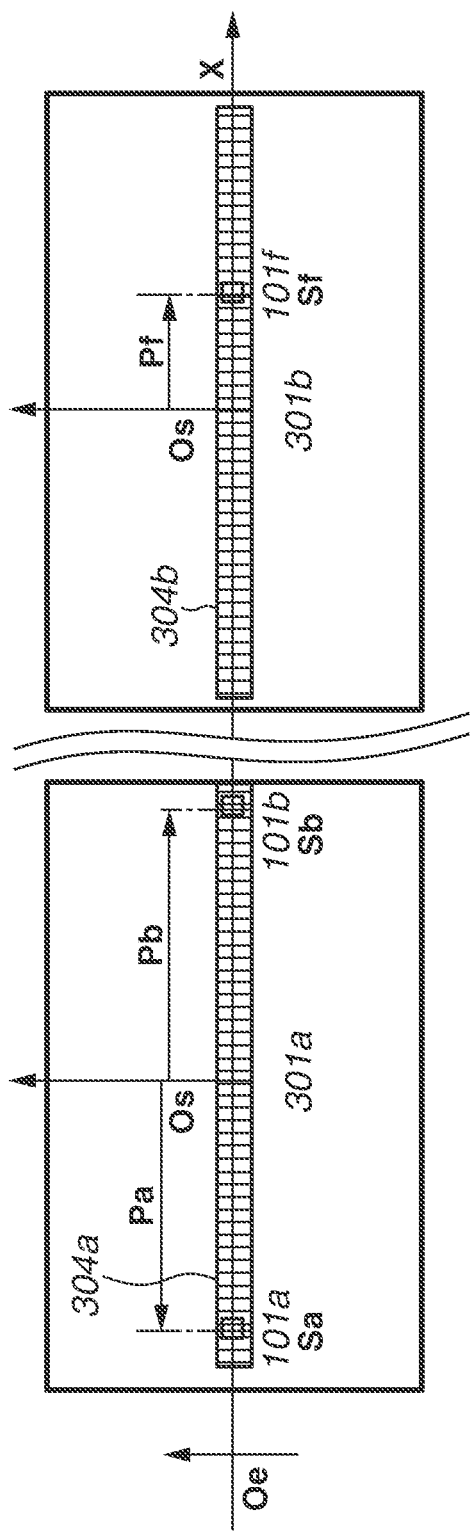

$$W = \frac{1}{1+\exp(-a*Pos_{sensor})}$$

$$W = |a*Pos_{sensor}+Ib*\frac{1}{2}$$

$$W = \frac{\{\tanh(Pos_{sensor})+1\}}{2}$$

$$W = \left(\frac{Pos_{sensor}}{1+|Pos_{sensor}|}+1\right)*\frac{1}{2}$$

CONVEYANCE APPARATUS, PRODUCTION SYSTEM, AND METHOD FOR MANUFACTURING ARTICLE

BACKGROUND

Field

Aspects of the present disclosure generally relate to a conveyance apparatus, a production system, and a method for manufacturing an article.

Description of the Related Art

Usually, a conveyance apparatus is used in a production line for assembling industrial products or in a production system such as a semiconductor exposure apparatus. Particularly, a conveyance apparatus for use in a production line conveys work, such as components, within an automated production line or between a plurality of stations between production lines. Moreover, a conveyance apparatus may also be used inside a production apparatus (process apparatus). Some previously proposed conveyance apparatuses include a conveyance apparatus using a moving-magnet type linear motor.

In the conveyance apparatus using a moving-magnet type linear motor, a permanent magnet is mounted on a mover and a linear motor stator is set on a frame in such a way as to face the permanent magnet. Additionally, a sensor for detecting the mover is provided on the frame with the stator set thereon. The position and orientation of the mover are calculated based on detection data obtained by the sensor, and the mover is controlled based on the calculated position and orientation of the mover, so that drive control over the linear motor is performed.

For example, Japanese Patent Application Laid-Open No. 5-64315 discusses a method for controlling a moving-magnet type magnetic levitation conveyance apparatus. In the magnetic levitation conveyance apparatus discussed in Japanese Patent Application Laid-Open No. 5-64315, a mover is set in such a way as to always face three displacement sensors and six magnetic poles, and the displacement sensors are used to calculate a vertical direction distance to the mover, so that the three-dimensional coordinates of the mover are determined and controlled.

SUMMARY

According to an aspect of the present disclosure, a conveyance apparatus includes a mover configured to move along a first direction, a stator including a plurality of first sensors arranged along the first direction, wherein each of the plurality of first sensors is configured to detect position information about the mover, and a control unit configured to correct the position information about the mover and control a position and/or orientation of the mover based on at least one of a relative position between at least one of the plurality of first sensors and the mover, wherein the relative position is obtained by (a) detection values of the plurality of first sensors and/or (b) detection times in which the plurality of first sensors each detect the position information about the mover.

Further features of the present disclosure will become apparent from the following description of exemplary embodiments with reference to the attached drawings.

BRIEF DESCRIPTION OF THE DRAWINGS

FIG. 5 is a schematic view used to explain conveyance direction position detection in the first exemplary embodiment of the present disclosure.

DESCRIPTION OF THE EMBODIMENTS

In the case of a conventional conveyance apparatus in which a mover is detected and controlled based on outputs from sensors set on the side of a stator, to control conveyance of the mover while continuously calculating the position and orientation of the mover, it is necessary to convey the mover while switching between the sensors according to the mover moving in a conveyance direction thereof.

At the time of switching between the sensors, it is ideal that outputs indicating the same detection plane are obtained from a sensor which ceases to detect the mover anew (an egression sensor) and a sensor which starts to detect the mover (an ingression sensor). However, differences may occur in outputs of the sensors due to, for example, the mounting accuracy of the sensors, a mechanical error of each sensor, or an unevenness in surface state of the mover serving as a detection target, so that the position and orientation of the mover which are detected with use of detection data obtained from the sensors undergo many changes. Accordingly, there is an issue in which an unfavorable behavior such as a vibration of the mover occurs, and the above-mentioned conventional conveyance apparatus is not able to remove such an issue. Then, the above-mentioned vibration may become a factor for a serious issues such as stable conveyance of the mover being not maintainable or work being broken.

Conveyance apparatuses according to exemplary embodiments of the present disclosure are described in detail below with reference to the drawings.

Figure 1:
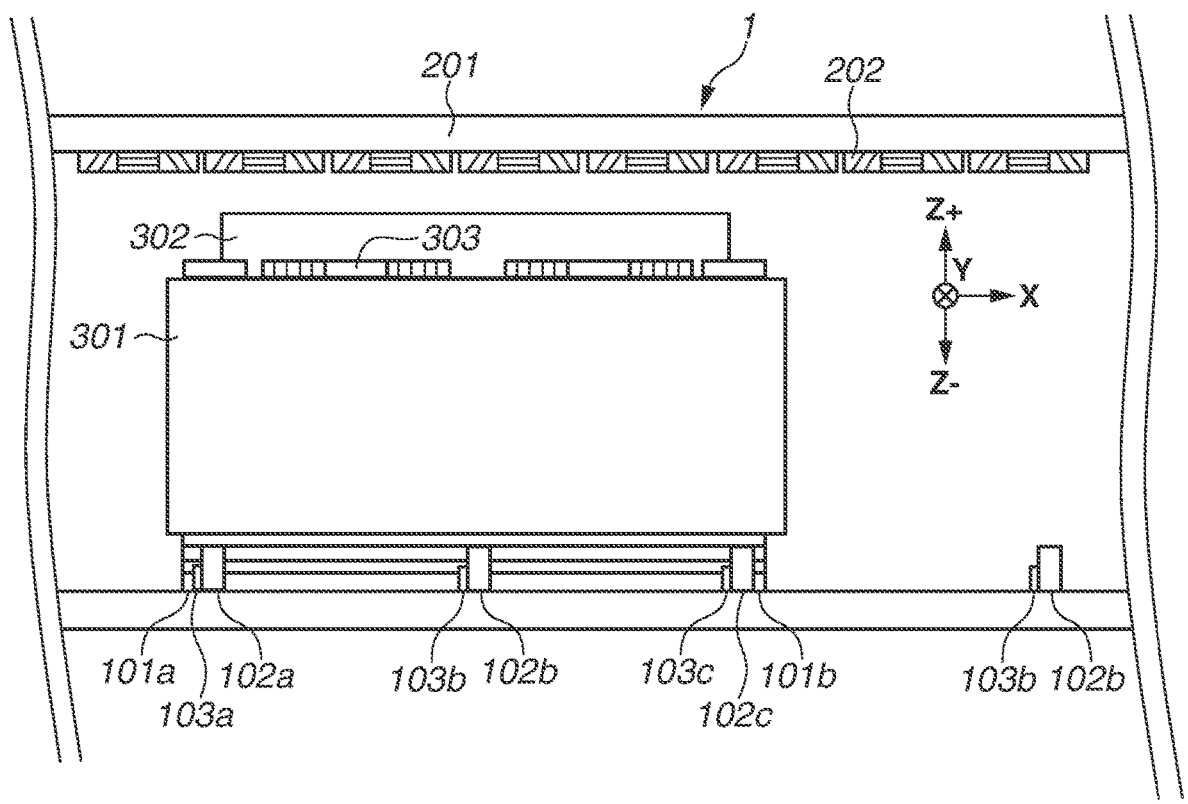
FIG. 1 is a schematic view illustrating a conveyance apparatus according to a first exemplary embodiment of the present disclosure.
Figure 2A:
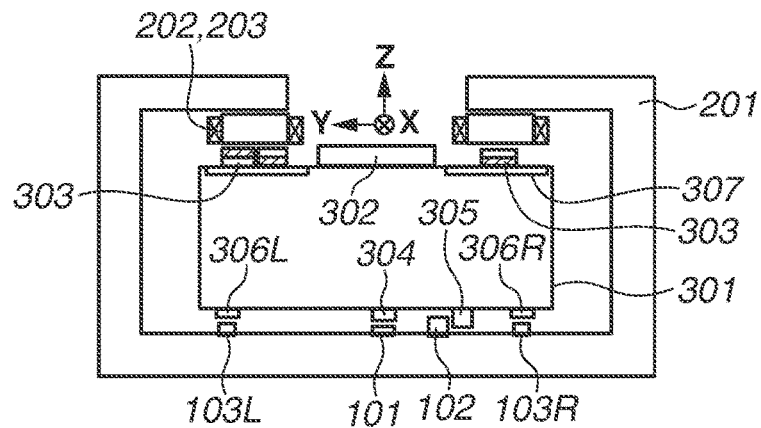
FIGS. 2A and 2B are schematic views illustrating the conveyance apparatus according to the first exemplary embodiment of the present disclosure.
Figure 2B:
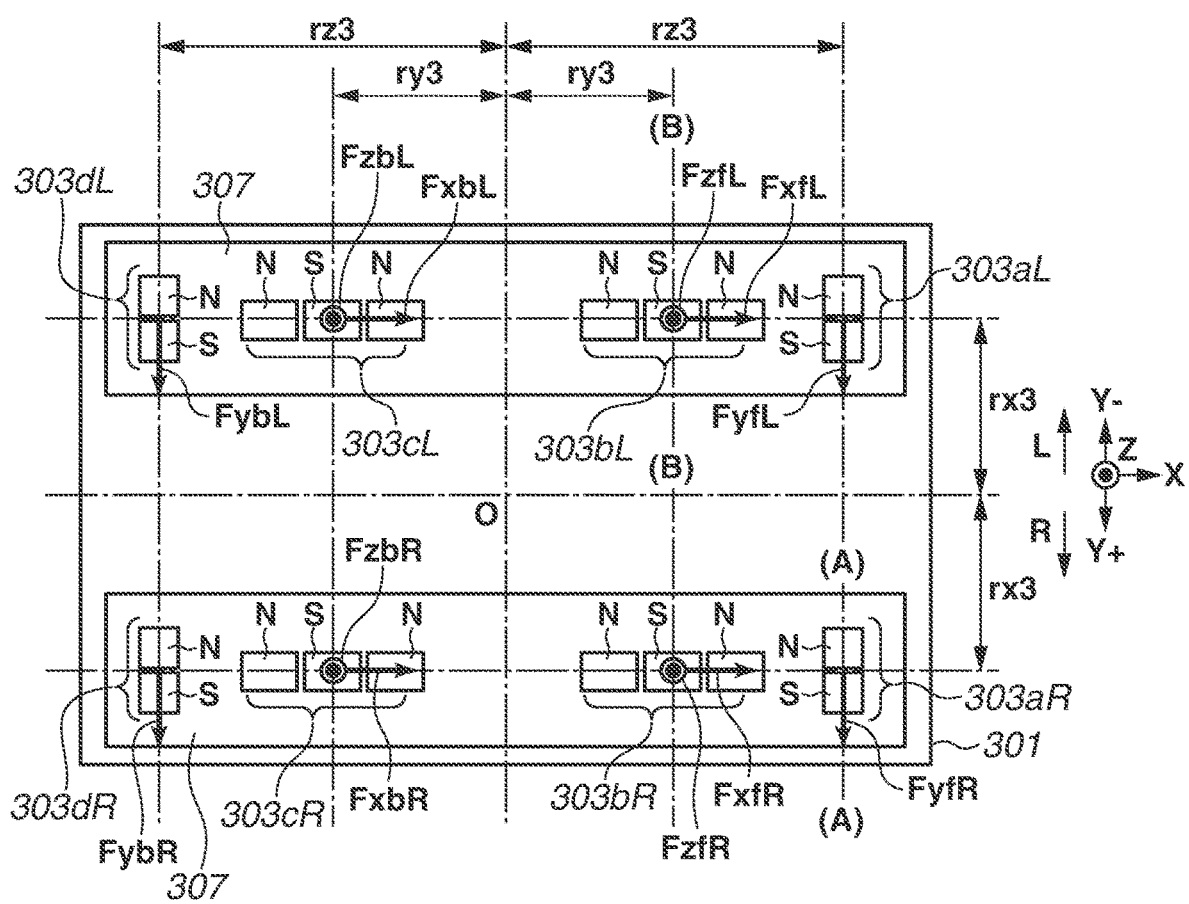

FIG. 1 and FIGS. 2A and 2B are schematic views illustrating a conveyance apparatus according to a first exemplary embodiment of the present disclosure.

Referring to FIG. 1 and FIGS. 2A and 2B, a conveyance apparatus 1 includes a stator 201, which constitutes a conveyance path, and a mover 301, which constitutes a dolly, slider, or carriage. FIG. 1 is a schematic view illustrating the stator 201 and the mover 301 in the first exemplary embodiment as viewed from the Y-direction. FIG. 2A is a schematic view illustrating the stator 201 and the mover 301 in the first exemplary embodiment as viewed from the minus X-direction. FIG. 2B illustrates the arrangement of permanent magnets 303 on the upper surface of the mover 301. Moreover, the left half of FIG. 2A illustrates a cross-section taken along line (A)-(A) in FIG. 2B. Moreover, the right half of FIG. 2A illustrates a cross-section taken along line (B)-(B) in FIG. 2B.

Furthermore, while FIG. 1 and FIGS. 2A and 2B illustrate a single mover 301 with respect to the stator 201, the first exemplary embodiment is not limited to this. In the conveyance apparatus 1, a plurality of movers 301 can be conveyed on the stator 201.

It is favorable that the conveyance apparatus 1 according to the first exemplary embodiment is used to convey work 302 held on the mover 301 to a production apparatus by conveying the mover 301 with use of the stator 201. Alternatively, the conveyance apparatus 1 according to the first exemplary embodiment can be used as a conveyance apparatus included in a production apparatus (process apparatus). Applying an operation (process operation), such as a processing operation or inspection operation, to work held on a mover which is conveyed by the conveyance apparatus in the first exemplary embodiment allows manufacturing articles with a high degree of accuracy.

Furthermore, a system including a conveyance apparatus in each exemplary embodiment and a production apparatus may in some cases be referred to as a "production system" in the present specification. The production apparatus in the present specification refers to an apparatus used to apply an operation, such as a processing operation or inspection operation, to work, and includes, for example, an inspection apparatus, an assembly apparatus, a semiconductor exposure apparatus, and a deposition apparatus. The production system in the first exemplary embodiment can include a plurality of production apparatuses, and the plurality of production apparatuses can be production apparatuses which are used to apply the same operation to work or can be production apparatuses which are used to apply the respective different operations to work.

Here, for example, coordinate axes and directions which are used in the following description are defined. First, an X-axis is taken along a horizontal direction, which is a conveyance direction of the mover 301, and the conveyance direction of the mover 301 is set as an X-direction. Moreover, a Z-axis is taken along a vertical direction, which is a direction perpendicular to the X-direction, and the vertical direction is set as a Z-direction. Moreover, a Y-axis is taken along a direction perpendicular to the X-direction and the Z-direction, and the direction perpendicular to the X-direction and the Z-direction is set as a Y-direction. Additionally, a rotation around the X-axis is set as a rotation Wx, and rotations around the Y-axis and the Z-axis are set as rotations Wy and Wz, respectively. Moreover, "*" is used as a sign for multiplication, and "^" is used as a sign for power. Moreover, a natural exponential function is dented by exp( ). Moreover, the Y-plus side of the mover 301 is referred to as the R-side, and the Y-minus side of the mover 301 is referred to as the L-side. Furthermore, while the conveyance direction of the mover 301 does not necessarily need to be the horizontal direction, even in that case, the conveyance direction can be set as the X-direction and the Y-direction and the Z-direction can be defined in a way similar to the above-mentioned way.

The conveyance apparatus 1 is configured as a magnetic levitation type conveyance apparatus which does not include a guide device such as a linear guide and conveys the mover 301 in a non-contact manner on the stator 201.

As illustrated in FIG. 2B, the mover 301 includes, as the permanent magnets 303, permanent magnets 303$a$R, 303$b$R, 303$c$R, 303$d$R, 303$a$L, 303$b$L, 303$c$L, and 303$d$L.

The permanent magnets 303$a$R, 303$b$R, 303$c$R, and 303$d$R are mounted on the upper surface at the R-side of the mover 301. Moreover, the permanent magnets 303$a$L, 303$b$L, 303$c$L, and 303$d$L are mounted on the upper surface at the L-side of the mover 301. Furthermore, in the following description, unless it is necessary to make a specific distinction, a permanent magnet of the mover 301 is referred to as a "permanent magnet 303". Moreover, in a case where, while it is not necessary to distinguish between the R-side and the L-side, it is necessary to individually identify the respective permanent magnets 303, the respective permanent magnets 303 are individually identified with use of reference characters up to the lower-case alphabetic characters serving as identifiers obtained by removing R or L from the tail end of the reference character of each permanent magnet 303. In this case, each permanent magnet 303 is individually identified by being referred to as "permanent magnet 303*a*", "permanent magnet 303*b*", "permanent magnet 303*c*", or "permanent magnet 303*d*".

The permanent magnets 303*a*R and 303*d*R are mounted at one end portion and the other end portion, respectively, in the X-direction on the upper surface at the R-side along the X-direction of the mover 301. The permanent magnets 303*b*R and 303*c*R are mounted between the permanent magnets 303*a*R and 303*d*R on the upper surface at the R-side of the mover 301. The permanent magnets 303*a*R, 303*b*R, 303*c*R, and 303*d*R are arranged, for example, at the same pitch in the X-direction. Moreover, the permanent magnets 303*a*R, 303*b*R, 303*c*R, and 303*d*R are arranged in such a manner that, for example, the respective centers thereof are aligned on a straight line which passes through the center of the upper surface at the R-side of the mover 301 and extends along the X-direction.

The permanent magnets 303*a*L and 303*d*L are mounted at one end portion and the other end portion, respectively, in the X-direction on the upper surface at the L-side along the X-direction of the mover 301. The permanent magnets 303*b*L and 303*c*L are mounted between the permanent magnets 303*a*L and 303*d*L on the upper surface at the L-side of the mover 301. The permanent magnets 303*a*L, 303*b*L, 303*c*L, and 303*d*L are arranged, for example, at the same pitch in the X-direction. Moreover, the permanent magnets 303*a*L, 303*b*L, 303*c*L, and 303*d*L are arranged in such a manner that, for example, the respective centers thereof are aligned on a straight line which passes through the center of the upper surface at the L-side of the mover 301 and extends along the X-direction. Additionally, the permanent magnets 303*a*L, 303*b*L, 303*c*L, and 303*d*L are arranged at the respective same positions as the permanent magnets 303*a*R, 303*b*R, 303*c*R, and 303*d*R as viewed in the X-direction.

While, in the first exemplary embodiment, an example in which a group of magnets is provided on the upper surface of the mover is illustrated, a group of magnets can be provided on the side surface of the mover.

The permanent magnets 303*a*R, 303*b*R, 303*c*R, and 303*d*R, which are arranged in portions at the R-side on the upper surface of the mover 301, are arranged at respective positions each away from an origin O, which is the center of the mover 301, by a distance rx3 at the R-side in the Y-direction.

Moreover, the permanent magnets 303*a*L, 303*b*L, 303*c*L, and 303*d*L, which are arranged in portions at the L-side on the upper surface of the mover 301, are arranged at respective positions each away from the origin O by a distance rx3 at the L-side in the Y-direction.

The permanent magnets 303*a* and 303*d* are mounted at respective positions each away from the origin O by a distance rz3 on one side and the other side, respectively, in the X-direction. The permanent magnets 303*c* and 303*b* are mounted at respective positions each away from the origin O by a distance ry3 on one side and the other side, respectively, in the X-direction.

In the upper surface of the mover 301, a middle portion between a portion at the R-side and a portion at the L-side on which the permanent magnets 303 are arranged as mentioned above serves as a portion on which to place work 302 which is to be conveyed.

Each of the permanent magnets 303*a*R, 303*d*R, 303*a*L, and 303*d*L is a set of two permanent magnets arranged along the Y-direction. Each of the permanent magnets 303*a* and 303*d* is configured with two permanent magnets arranged side by side along the Y-direction in such a manner that the polarities of the respective outside magnetic poles thereof facing the stator 201 are alternating with each other. Furthermore, the number of permanent magnets arranged along the Y-direction which configure each of the permanent magnets 303*a* and 303*d* is not limited to two, and only needs to be plural. Moreover, The direction along which permanent magnets which constitute each of the permanent magnets 303*a* and 303*d* are arranged does not necessarily need to be the Y-direction, which is perpendicular to the X-direction serving as the conveyance direction, and only needs to be a direction (second direction) intersecting with the X-direction (first direction). Thus, each of the permanent magnets 303*a* and 303*d* only needs to be a magnet group composed of a plurality of permanent magnets arranged along a direction (second direction) intersecting with the X-direction in such a manner that the polarities of the respective magnetic poles thereof are alternating with each other.

On the other hand, each of the permanent magnets 303*b*R, 303*c*R, 303*b*L, and 303*c*L is a set of three permanent magnets arranged along the X-direction. Each of the permanent magnets 303*b* and 303*c* is configured with three permanent magnets arranged side by side along the X-direction in such a manner that the polarities of the respective outside magnetic poles thereof facing the stator 201 are alternately different from each other. Furthermore, the number of permanent magnets arranged along the X-direction which configure each of the permanent magnets 303*b* and 303*c* is not limited to three, and only needs to be plural. Thus, each of the permanent magnets 303*b* and 303*c* only needs to be a magnet group composed of a plurality of permanent magnets arranged along the X-direction in such a manner that the polarities of the respective magnetic poles thereof are alternating with each other.

The permanent magnets 303 are mounted on yokes 307 provided on the upper surface at the R-side and the L-side of the mover 301. Each yoke 307 is made from a high-permeability material, such as iron. In the present specification, the high-permeability material refers to a material with a magnetic permeability of 5,000 or more.

In this way, the mover 301, on which the permanent magnets 303 are mounted, is subjected to 6-axis control with respect to the orientation thereof and controlled to be movable in the X-direction by electromagnetic forces which the permanent magnets 303 receive from a plurality of coils 202 of the stator 201 as described below.

On the other hand, a plurality of coils 202 is mounted on the stator 201 in such a way as to be located above the upper surface of the mover 301 as illustrated in FIG. 2A. The plurality of coils 202 is mounted on the stator 201 while being arranged in two lines along the X-direction in such a way as to be able to face, from above, the respective permanent magnets 303 in the portions at the R-side and the L-side on the upper surface of the mover 301. A plurality of coils 202 at the R-side is arranged in line along the X-direction in such a way as to be able to face, from above, the permanent magnets 303*a*R, 303*b*R, 303*c*R, and 303*d*R at the R-side of the mover 301. A plurality of coils 202 at the L-side is arranged in line along the X-direction in such a way as to be able to face, from above, the permanent magnets 303*a*L, 303*b*L, 303*c*L, and 303*d*L at the L-side of the mover 301.

The mover 301 is movable in the X-direction along the plurality of coils 202, which is arranged in two lines along the X-direction. The mover 301 is conveyed with work 102, which is to be conveyed, loaded on the upper surface thereof. The mover 301 can include, for example, a holding mechanism which holds work 102 on the mover 301, such as a work holder.

The stator 201 includes a plurality of coils 202 arranged in two lines along the X-direction, which is the conveyance direction of the mover 301. The stator 201 extends in the X-direction, which is the conveyance direction, and thus constitutes a conveyance path for the mover 301.

The plurality of coils 202 is mounted on the stator 201 while being arranged in two lines along the X-direction in such a way as to be able to face the permanent magnets 303 at the R-side and the L-side of the mover 301. A plurality of coils 202 arranged in line at the R-side is arranged along the X-direction in such a way as to be able to face the permanent magnets 303aR, 303bR, 303cR, and 303dR at the R-side of the mover 301. Moreover, a plurality of coils 202 arranged in line at the L-side is arranged along the X-direction in such a way as to be able to face the permanent magnets 303aL, 303bL, 303cL, and 303dL at the L-side of the mover 301.

In the first exemplary embodiment, lines of coils 202 at the R-side and the L-side of the mover 301 are arranged in such a way as to be able to respectively face the permanent magnets 303a and 303d and the permanent magnets 303b and 303c, the arrangement directions of a plurality of permanent magnets of which differ from each other. Therefore, a small number of lines of coils 202 are able to be used to apply forces in the conveyance direction and in a direction different from the conveyance direction to the mover 301 as described below, so that conveyance control and orientation control over the mover 301 can be implemented.

The plurality of coils 202 is arranged side by side in the X-direction at predetermined intervals. Moreover, each coil 202 is mounted in such a manner that the central axis thereof is oriented to the Z-direction. Furthermore, the coil 202 can be a coil having a core or can be a coreless coil.

The plurality of coils 202 is configured to be subjected to current control, for example, in units of three coils. The unit of coils 202 subjected to current control is referred to as a "coil unit 203". Upon being energized, the coil 202 generates an electromagnetic force between the coil 202 and the permanent magnet 303 of the mover 301, thus being able to apply a force to the mover 301.

Referring to FIG. 2B, each of the permanent magnets 303a and 303d is composed of a magnet group including two permanent magnets arranged side by side in the Y-direction. In response, each coil 202 is arranged in such a manner that the center in the Y-direction of two permanent magnets of each of the permanent magnets 303a and 303d accords with the center in the Y-direction of the coil 202. Energizing coils 202 facing the permanent magnets 303a and 303d causes forces to be generated in the Y-direction onto the permanent magnets 303a and 303d.

Moreover, each of the permanent magnets 303b and 303c is composed of a magnet group including three permanent magnets arranged side by side in the X-direction. In response, energizing coils 202 facing the permanent magnets 303b and 303c causes forces to be generated in the X-direction and the Z-direction onto the permanent magnets 303b and 303c. While, in the first exemplary embodiment, permanent magnets are used as magnets constituting a magnet group, electromagnets can be used instead.

An X-sensor 101 (first sensor) illustrated in FIG. 2A is, for example, a linear encoder which detects a linear scale 304 mounted on the mover 301 and thus identifies the position in the conveyance direction of the mover 301. Moreover, a Y-sensor 102 (second sensor) illustrated in FIG. 2A detects a Y-direction distance between the mover 301 and the Y-sensor 102. A Z-sensor 103 (third sensor) illustrated in FIG. 2A detects a Z-direction distance between the mover 301 and the Z-sensor 103. For example, eddy-current sensors can be arranged as the Y-sensor and the Z-sensor. Furthermore, instead of the linear encoder, for example, a laser interferometer can be used as the X-sensor.

A plurality of X-sensors 101 (first sensors) is mounted on the stator 201 along the X-direction (first direction) in such a way as to be able to respectively face a linear scale 304 of the mover 301. Each X-sensor 101 reads the linear scale 304 mounted on the mover 301, thus being able to detect a relative position of the mover 301 with respect to the X-sensor 101 and output a detection value indicating the detected relative position.

A plurality of Y-sensors 102 (second sensors) is mounted on the stator 201 along the X-direction (first direction) in such a way as to be able to respectively face a Y-target 305 of the mover 301. Each Y-sensor 102 is able to detect a relative distance in the Y-direction between the Y-sensor 102 and the Y-target 305 mounted on the mover 301 and output a detection value indicating the detected relative distance. The Y-target 305 as used herein is a projection mounted on the mover 301 and having a surface parallel to the conveyance direction targeted for the mover 301, and the surface parallel to the conveyance direction targeted for the mover 301 is measured by the Y-sensor 102, which is fixed to the stator 201. This allows detecting the position and/or the orientation in the Y-direction of the mover 301. The Y-sensor 102 (second sensor) does not necessarily need to detect a relative distance in the Y-direction, which is perpendicular to the X-direction serving as the conveyance direction, and only needs to detect a relative distance in a direction (second direction) intersecting with the X-direction (first direction). While it is possible to directly detect a relative distance between the mover 301 and the Y-sensor 102, since it may in some cases be difficult to process the mover 301 itself with a high degree of accuracy, in such cases, it is useful to employ the Y-target 305.

A plurality of Z-sensors 103 (third sensors) is mounted on the stator 201 in two lines along the X-direction in such a way as to be able to respectively face Z-targets 306 of the mover 301. Each Z-sensor 103 is able to detect a relative distance in the Z-direction between the Z-sensor 103 and the Z-target 306 mounted on the mover 301 and output a detection value indicating the detected relative distance. The Z-target 306 as used herein is a projection mounted on the mover 301 and having a surface perpendicular to the vertical direction, and the surface perpendicular to the vertical direction is measured by the Z-sensor 103, which is fixed to the stator 201. This allows detecting the position and/or the orientation in the vertical direction of the mover 301. The Z-sensor 103 (third sensor) does not necessarily need to detect a relative distance in the Z-direction, which is perpendicular to the X-direction serving as the conveyance direction, and only needs to detect a relative distance in a direction (third direction) intersecting with the X-direction (first direction). While it is possible to directly detect a relative distance between the mover 301 and the Z-sensor 103, since it may in some cases be difficult to process the mover 301 itself with a high degree of accuracy, in such cases, it is useful to employ the Z-target 306.

In the first exemplary embodiment, an example in which the X-sensors 101, the Y-sensors 102, and the Z-sensors 103 are provided on the bottom portion of the stator 201 and the linear scale 304, the Y-target 305, and the Z-targets 306 are provided on the bottom surface of the mover 301 has been described. However, the first exemplary embodiment is not limited to this. The X-sensors 101, the Y-sensors 102, and the Z-sensors 103 can be provided at any position of the mover 301, and the linear scale 304, the Y-target 305, and the Z-targets 306 can be at any position of the stator 201 as long as such two positions are positions able to face each other. Moreover, it is not necessary to include both the Y-sensor 102 and the Z-sensor 103, and the advantageous or beneficial effects of the present exemplary embodiment can be exerted even if only one of the Y-sensor 102 and the Z-sensor 103 is provided. For example, even without the Y-sensor 102, the present exemplary embodiment can also be applied to, for example, a conveyance apparatus which, with regard to the Y-direction, does not perform control using only a magnetic attractive force of a magnet. Moreover, even without the Z-sensor 103, the present exemplary embodiment can also be applied to a configuration which, with regard to the Z-direction, does not perform control using only a magnetic attractive force of a magnet. Alternatively, the present exemplary embodiment can also be applied to a configuration which performs levitation control by a different method such as the use of air. Additionally, the present exemplary embodiment can also be applied to, for example, an XY stage, which does not perform levitation control in the Z-direction.

Figure 3:
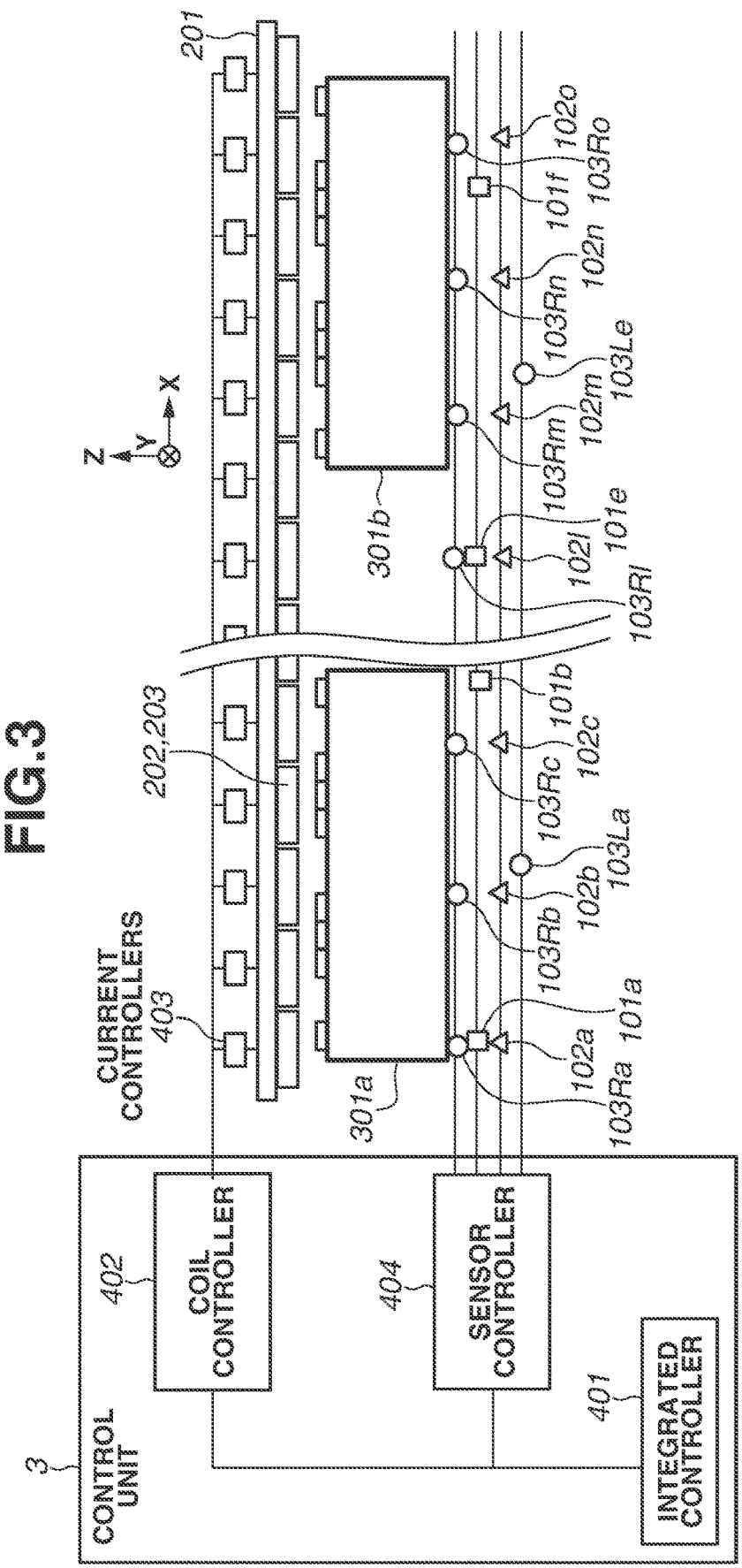
FIG. 3 is a configuration diagram of a conveyance system in the first exemplary embodiment of the present disclosure.

Next, a control unit which controls the conveyance apparatus 1 according to the first exemplary embodiment is described with further reference to FIG. 3. FIG. 3 is a schematic view illustrating a control unit 3 which controls the conveyance apparatus 1 according to the first exemplary embodiment.

As illustrated in FIG. 3, the control unit 3 includes an integrated controller 401, a coil controller 402, and a sensor controller 404, and functions as a control unit which controls the conveyance apparatus 1 including the mover 301 and the stator 201. The coil controller 402 is connected to the integrated controller 401 in such a way as to be able to communicate with the integrated controller 401. Moreover, the sensor controller 404 is connected to the integrated controller 401 in such a way as to be able to communicate with the integrated controller 401.

A plurality of current controllers 403 is connected to the coil controller 402 in such a way as to be able to communicate with the coil controller 402. The coil controller 402 and the plurality of current controllers 403 connected thereto are provided in association with the respective lines of coils 202 arranged in two lines. Each coil unit 203 is connected to an associated one of the current controllers 403. The current controller 403 is able to control the magnitude of a current flowing to each coil 202 of the coil unit 203 connected thereto.

The coil controller 402 issues an instruction for a current value serving as a target to each of the current controllers 403 connected thereto. The current controller 403 controls the amount of a current flowing to the coil 202 connected thereto.

A plurality of X-sensors 101, a plurality of Y-sensors 102, and a plurality of Z-sensors 103 are connected to the sensor controller 404 in such a way as to be able to communicate with the sensor controller 404.

The plurality of X-sensors 101 is mounted on the stator 201 at such intervals that, even when movers 301 are being conveyed, one X-sensor 101 of the plurality of X-sensors 101 is able to measure the position of one mover 301 to a predetermined level of assurance. Moreover, the plurality of Y-sensors 102 is mounted on the stator 201 at such intervals that two Y-sensors 102 of the plurality of Y-sensors 102 are able to surely measure the Y-target 305 of one mover 301. Moreover, the plurality of Z-sensors 103 is mounted on the stator 201 at such intervals that three Z-sensors 103 of the plurality of Z-sensors 103 arranged in two lines are able to surely measure the Z-target 306 of one mover 301.

The integrated controller 401 determines current instruction values, which are to be applied to the plurality of coils 202, based on outputs from the X-sensor 101, the Y-sensor 102, and the Z-sensor 103 and transmits the determined current instruction values to the coil controller 402. The coil controller 402 issues instructions for current values to the current controllers 403 as mentioned above based on the current instruction values transmitted from the integrated controller 401. With this control operation, the integrated controller 401 acts as a control device, and thus conveys the mover 301 in a non-contact manner along the stator 201 and controls the orientation of the mover 301, which is being conveyed, with six axes.

Figure 4:
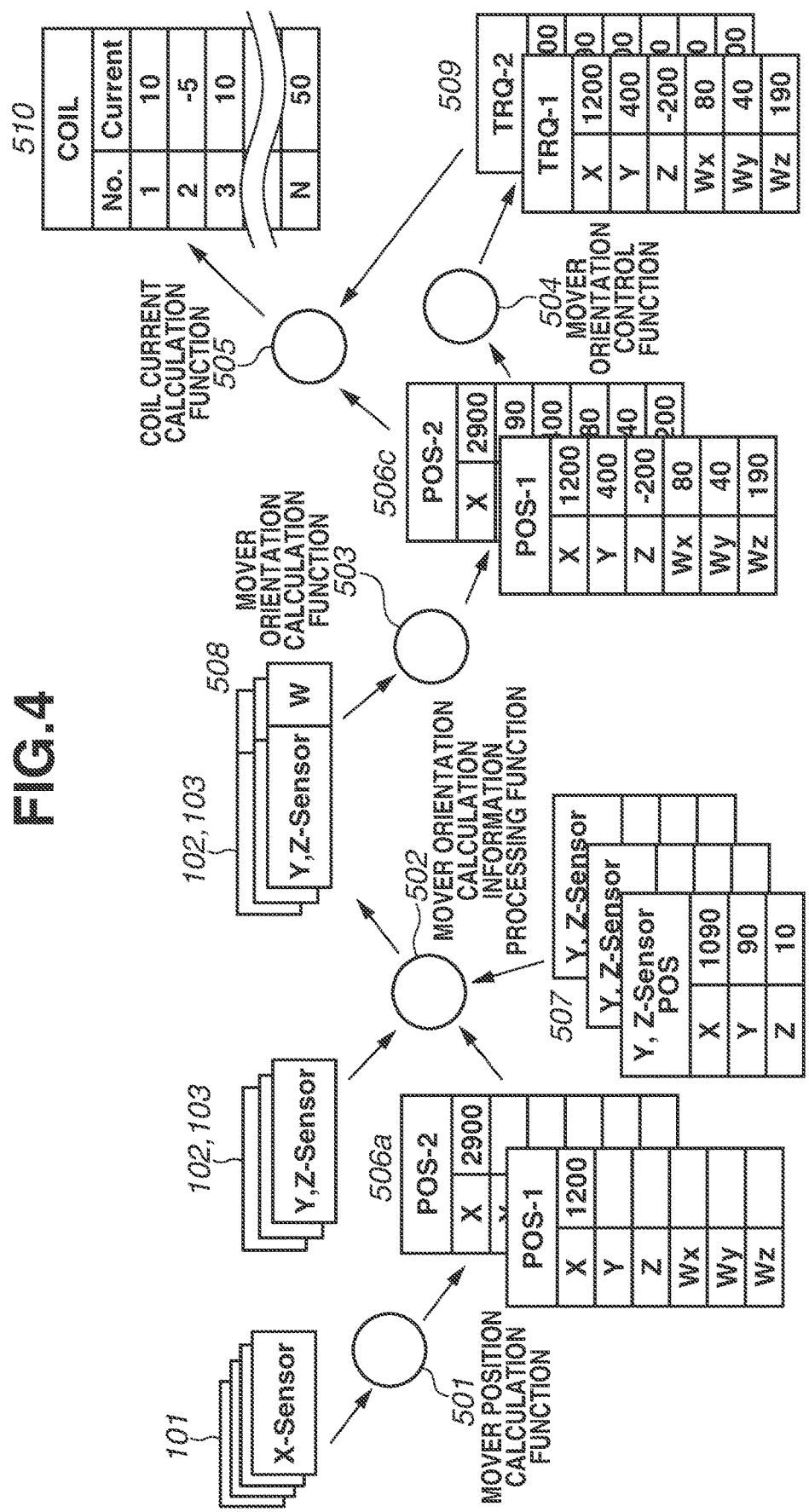
FIG. 4 is a schematic view illustrating a data flow in the first exemplary embodiment of the present disclosure.

In the following description, an orientation control method for the mover 301, which is performed by the integrated controller 401, is described with reference to FIG. 4. FIG. 4 is a schematic view illustrating an orientation control method for the mover 301 in the conveyance apparatus 1 according to the first exemplary embodiment. FIG. 4 illustrates the outline of an orientation control method for the mover 301 while mainly focusing on the flow of data for the orientation control method. The integrated controller 401 performs processing using a mover position calculation function 501, a mover orientation calculation information processing function 502, a mover orientation calculation function 503, a mover orientation control function 504, and a coil current calculation function 505 as described below. With this processing, the integrated controller 401 controls conveyance of the mover 301 while controlling the orientation of the mover 301 with six axes. Furthermore, instead of the integrated controller 401, the coil controller 402 can be configured to perform processing similar to that performed by the integrated controller 401.

First, the mover position calculation function 501 calculates the number and respective positions of movers 301 present on the stator 201, which constitutes a conveyance path, from measured values obtained from the plurality of X-sensors 101 and information about the mounting positions of the respective X-sensors 101. With this calculation, the mover position calculation function 501 updates mover position information (X) and number-of-movers information included in mover information 506, which is information about the mover 301. The mover position information (X) indicates a position in the X-direction serving as the conveyance direction of the mover 301 present on the stator 201. The mover information 506 is prepared for each of movers 301 present on the stator 201 as illustrated as, for example, POS-1, POS-2, . . . , in FIG. 4.

Next, the mover orientation calculation information processing function 502 identifies Y-sensors 102 and Z-sensors 103 which are able to measure the respective movers 301 based on the mover position information (X) included in the mover information 506 updated by the mover position calculation function 501. At that time, the mover orientation calculation information processing function 502 calculates coefficients (W) based on sensor mounting position information 507 on the stator 201 about the identified Y-sensors 102 and Z-sensors 103 and the mover position information (X).

The mover orientation calculation function 503 calculates orientation information (Y, Z, Wx, Wy, Wz) based on detection values output from the identified Y-sensors 102 and Z-sensors 103 and the coefficients (W) calculated by the mover orientation calculation information processing function 502, and updates the mover information 506 with the calculated orientation information (Y, Z, Wx, Wy, Wz). Thus, the mover information 506 updated by the mover orientation calculation function 503 includes mover position information (X) and orientation information (Y, Z, Wx, Wy, Wz).

Next, the mover orientation control function 504 calculates application force information 509 about each mover 301 from the current mover information 506, which includes mover position information (X) and orientation information (Y, Z, Wx, Wy, Wz), and an orientation target value. The application force information 509 is information about the magnitude of a force which is to be applied to each mover 301. The application force information 509 includes three axial components (Tx, Ty, Tz) in force and three axial components (Twx, Twy, Twz) in torque of a force T which is to be applied described below. The application force information 509 is prepared for each of the movers 301 present on the stator 201 as illustrated as, for example, TRQ-1, TRQ-2, . . . , in FIG. 4.

Next, the coil current calculation function 505 determines current instruction values 510, which are to be applied to the respective coils 202, based on the application force information 509 and the mover information 506.

In this way, the integrated controller 401 determines the current instruction values 510 by performing processing using the mover position calculation function 501, the mover orientation calculation information processing function 502, the mover orientation calculation function 503, the mover orientation control function 504, and the coil current calculation function 505. The integrated controller 401 Altertransmits the determined current instruction values 510 to the coil controller 402.

Here, processing which is performed by the mover position calculation function 501 is described with reference to FIG. 5. FIG. 5 is a schematic view used to explain processing which is performed by the mover position calculation function 501. Moreover, FIG. 5 is a diagram illustrating a positional relationship between the linear scales 304a and 304b mounted on the bottom surfaces of the movers 301a and 301b and the X-sensors 101a to 101f, which are illustrated in FIG. 1 and FIG. 3, when the movers 301 are viewed from the minus Z-direction illustrated in FIG. 1.

In FIG. 5, a reference point Oe is a positional reference for the stator 201, on which the X-sensors 101 are mounted. Moreover, a reference point Os is a positional reference for each of the linear scales 304a and 304b mounted on each mover 301. FIG. 5 illustrates a case where two movers 301a and 301b are conveyed as the movers 301 and three X-sensors 101a, 101b, and 101f are arranged as the X-sensors 101. Furthermore, the linear scales 304a and 304b are mounted at the respective same positions in the movers 301a and 301b along the X-direction.

For example, one X-sensor 101f is facing the linear scale 304b of the mover 301b illustrated in FIG. 5. The X-sensor 101f reads the linear scale 304b of the mover 301b and thus outputs a distance Pf. Moreover, a position on the X-axis of the X-sensor 101f with the reference point Oe set as an origin is Sf. Accordingly, the position Pos(301b) of the mover 301b is able to be calculated according to the following formula (1).

$$Pos(301b)=Sf-Pf \quad (1)$$

For example, two X-sensor 101a and 101b are facing the linear scale 304a of the mover 301a illustrated in FIG. 5. The X-sensor 101a reads the linear scale 304a of the mover 301a and thus outputs a distance Pa. Moreover, a position on the X-axis of the X-sensor 101a with the reference point Oe set as an origin is Sa. Accordingly, the position Pos(301a) on the X-axis of the mover 301a that is based on a detection value output from the X-sensor 101a is able to be calculated according to the following formula (2).

$$Pos(301a)=Sa-Pa \quad (2)$$

Moreover, the X-sensor 101b reads the linear scale 304a of the mover 301a and thus outputs a distance Pb. Moreover, a position on the X-axis of the X-sensor 101b with the reference point Oe set as an origin is Sb. Accordingly, the position Pos(301a)' on the X-axis of the mover 301a that is based on a detection value output from the X-sensor 101b is able to be calculated according to the following formula (3).

$$Pos(301a)'=Sb-Pb \quad (3)$$

Here, since the respective mounting positions of the X-sensors 101a and 101b are previously measured in an accurate way, a difference between the two values Pos(301a) and Pos(301a)' is sufficiently small. In this way, in a case where a difference between positions on the X-axis of the mover 301 that are based on outputs of two X-sensors 101 is sufficiently small, it can be determined that such two X-sensors 101 are observing the linear scale 304 of one and the same mover 301.

Furthermore, in a case where a plurality of X-sensors 101 is facing one and the same mover 301, for example, calculating the average value of positions that are based on outputs of a plurality of X-sensors 101 allows uniquely determining the position of the observed mover 301. Alternatively, a position that is based on a detection value output from any one of the X-sensors 101 can be determined as the position of the mover 301.

The mover position calculation function 501 calculates and determines the position X in the X-direction of the mover 301 as mover position information based on an output of the X-sensor 101 in the above-described way. Y-sensors 102 and Z-sensors 103 which are able to measure respective movers 301 are identified based on the mover position information (X) included in the mover information 506 updated by the mover position calculation function 501.

Figure 6A:
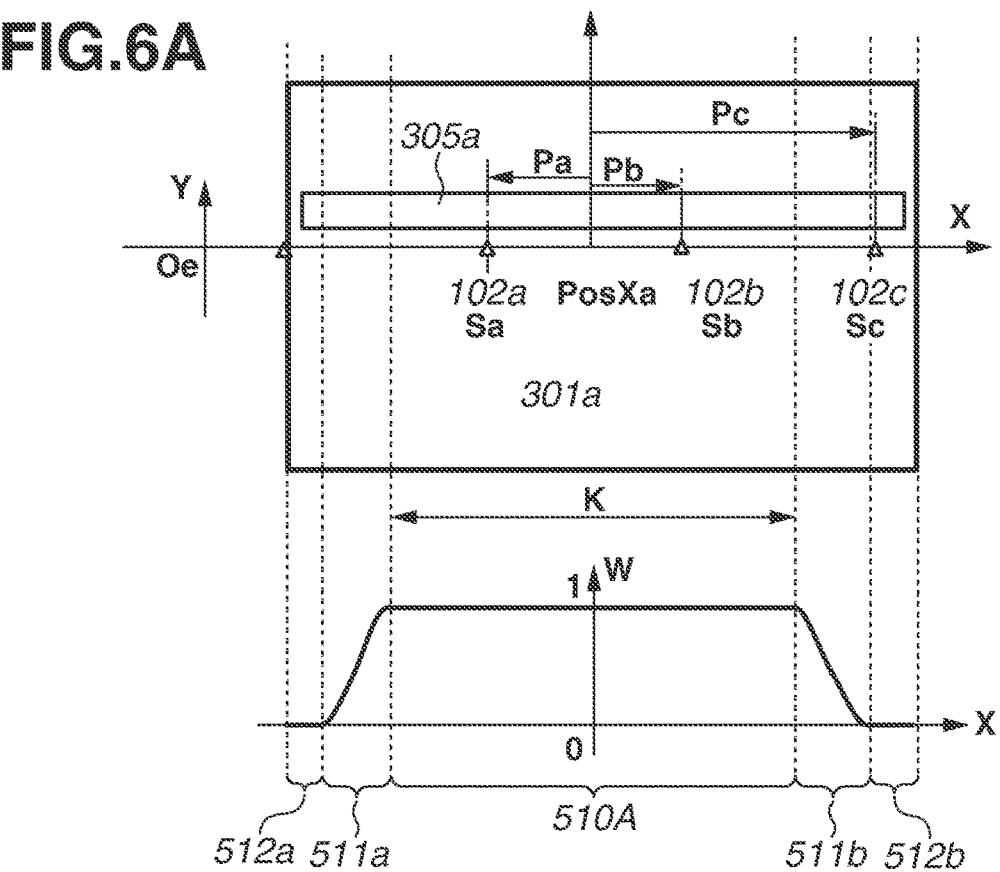
FIGS. 6A and 6B are schematic views used to explain mover orientation calculation information processing in a direction perpendicular to a conveyance direction in the first exemplary embodiment of the present disclosure.
Figure 6B:
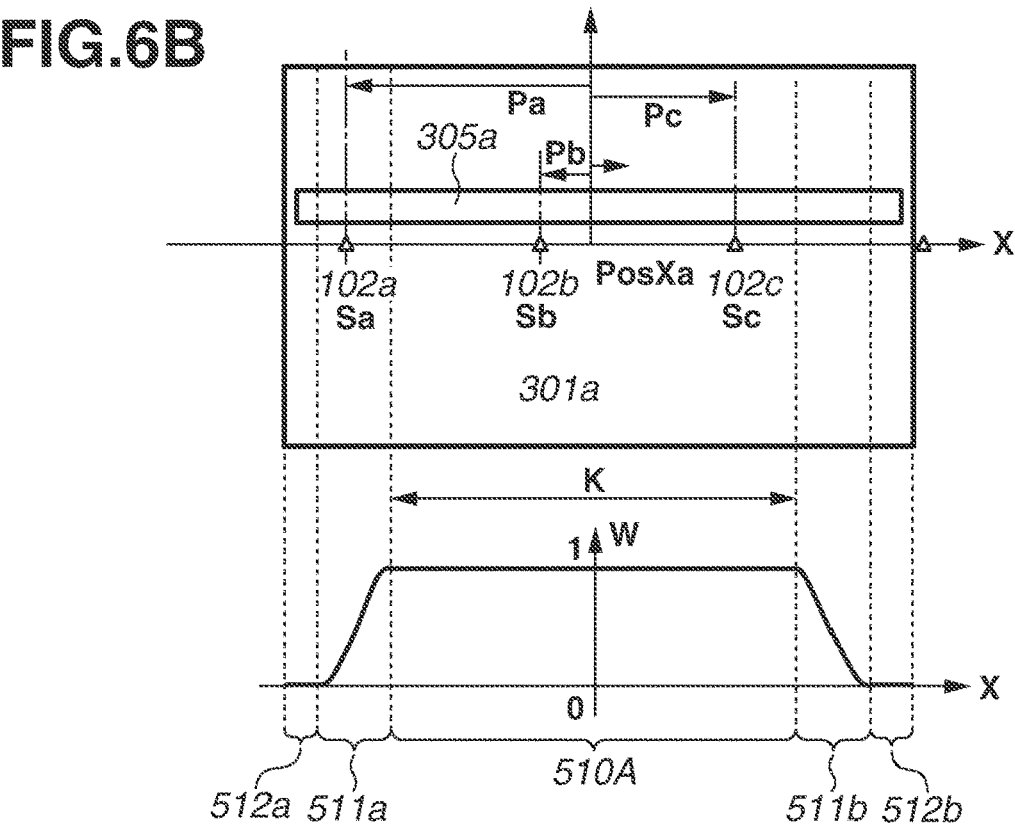

Next, processing which is performed by the mover orientation calculation information processing function 502 is described with reference to FIGS. 6A and 6B. The upper half of each of FIGS. 6A and 6B illustrates a positional relationship between the Y-target 305 (305a) mounted on the bottom surface of the mover 301 (301a) and the Y-sensors 102 (102a to 102c) illustrated in FIG. 1 when the mover 301a is viewed from the minus Z-direction illustrated in FIG. 1. FIG. 6B illustrates a state in which the mover 301a has slightly advanced along the plus X-direction as compared with the state illustrated in FIG. 6A.

The mover 301 or the Y-target 305 of the mover 301 has previously-set detection target regions including a first region set in a middle portion thereof, second regions set in end portions thereof, and third regions set between the first region and the second regions. Hereinafter, the first region may in some cases be referred to as a sensor information effective region 510A, the second regions many in some cases be referred to as sensor information ineffective regions 512a and 512b, and the third regions many in some cases be referred to as sensor information load regions 511a and 511b.

As illustrated in the lower half of each of FIGS. 6A and 6B, the sensor information effective region 510A is a region in which it is determined that sensor information is effective (a region to which a coefficient W of "1" is assigned).

The sensor information ineffective regions 512a and 512b are regions in which the Y-sensor 102 detects an end of the Y-target 305 and a detection value output from the Y-sensor 102 thus becomes unstable, in other words, a detection error becomes greater than or equal to a given value, and are regions provided to disregard a detection value output from the Y-sensor 102 (regions to which a coefficient W of "0" is assigned).

The sensor information load regions 511a and 511b are regions between the sensor information effective region 510A and the sensor information ineffective regions 512a and 512b, and are regions provided to add weight to a detection value output from the Y-sensor 102 according to positions in those regions (regions to which a coefficient W of greater than or equal to "0" and less than or equal to "1" is assigned). In this way, position information about the mover 301 obtained with use of detection values output from the Y-sensors 102 is able to be adjusted with use of the coefficients W.

For example, with regard to the mover 301a illustrated in FIG. 6A, the mover position information (X) is calculated to be PosXa. Then, based on a relationship between PosXa and Sa, Sb, and Sc, which are pieces of sensor mounting position information 507, three Y-sensors 102a, 102b, and 102c are identified as Y-sensors 102 which are able to measure the mover 301a.

Since it is determined that the Y-sensors 102a and 102b illustrated in FIG. 6A are present in the sensor information effective region 510A, the coefficients W are calculated as in the following formulae (4) and (5).

$$W(102a)=1 \tag{4}$$

$$W(102b)=1 \tag{5}$$

Since it is determined that the Y-sensor 102c illustrated in FIG. 6A is present in the sensor information ineffective region 512b, the coefficient W is calculated as in the following formula (6).

$$W(102c)=0 \tag{6}$$

Similarly, with regard to the mover 301a illustrated in FIG. 6B, the mover position information (X) is calculated to be PosXa, and a plurality of Y-sensors 102a, 102b, and 102c is identified as Y-sensors 102 which are able to measure the mover 301a.

Since it is determined that the Y-sensors 102b and 102c illustrated in FIG. 6B are present in the sensor information effective region 510A, the coefficients W are calculated as in the following formulae (7) and (8).

$$W(102b)=1 \tag{7}$$

$$W(102c)=1 \tag{8}$$

Figure 7A:
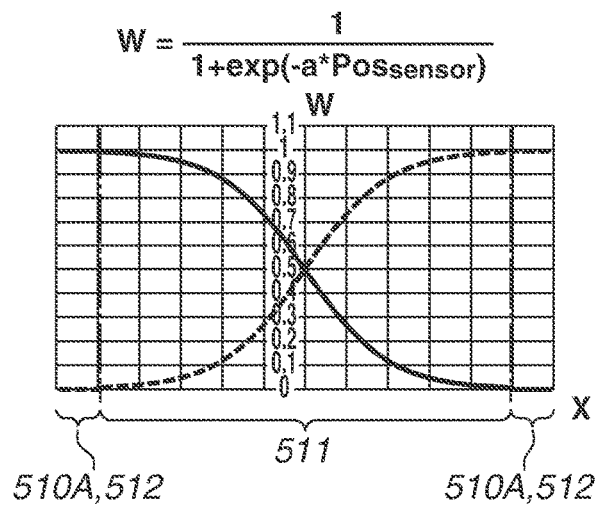
FIGS. 7A, 7B, 7C, 7D, and 7E are schematic views illustrating, by an example, functions for calculating coefficients based on mounting position information about sensors in the first exemplary embodiment of the present disclosure.

Moreover, it is determined that the Y-sensor 102a illustrated in FIG. 6B is present in the sensor information load region 511a. In such a case where it is determined that the Y-sensor 102 is present in the sensor information load region 511a, a coefficient (W) of greater than or equal to "0" and less than or equal to "1" is calculated. For example, with use of a continuous function which monotonously increases or decreases from "0" to "1" or from "1" to "0", for example, a sigmoid function such as the following formula (9), the coefficient (W) is calculated to be a value of greater than or equal to "0" and less than or equal to "1". In formula (9), "a" is a gain in the sigmoid function. FIG. 7A illustrates a function of the coefficient W. A dashed line in FIG. 7A represents a function of the coefficient (W) in the sensor information load region 511a. Furthermore, a solid line in FIG. 7A represents a function of the coefficient (W) in the sensor information load region 511b. In formula (9), "Pa" is a relative distance between the Y-sensor 102a and the mover 301a which is calculated from PosXa, which is mover position information (X), and Sa, which is sensor mounting position information 507 about the Y-sensor 102a.

$$W(102a)=1/(1+\exp(-a*Pa)) \tag{9}$$

Similar processing is also performed with respect to the Z-sensors 103.

Figure 8A:
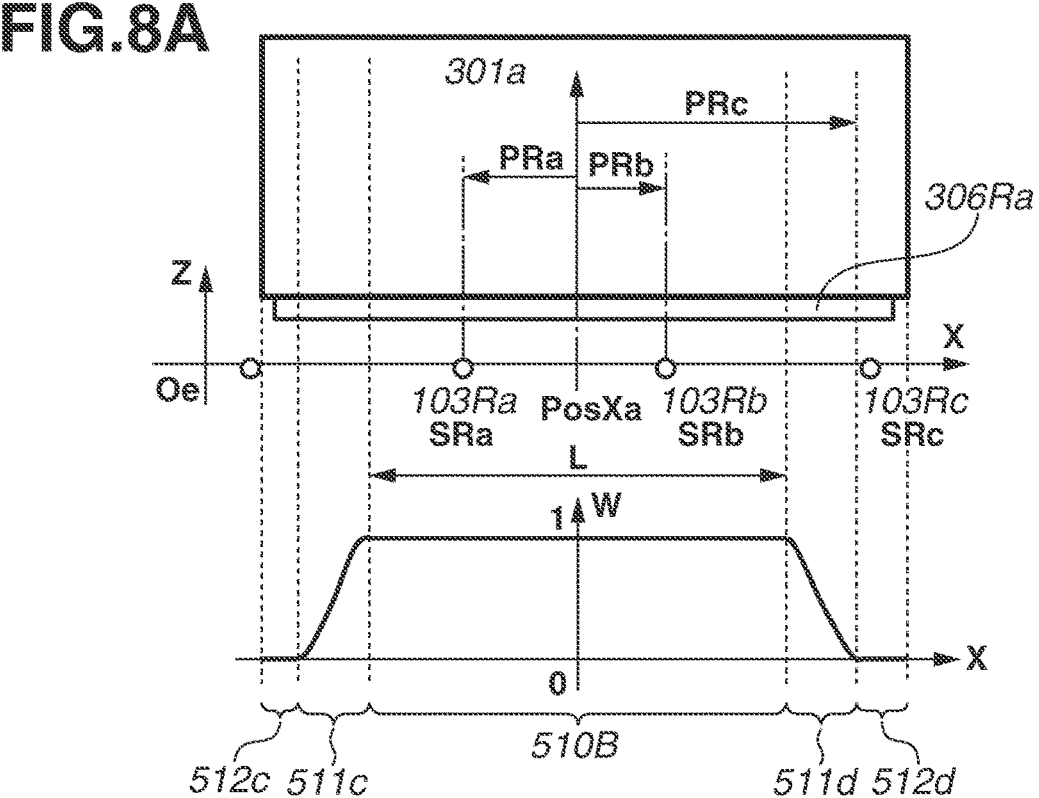
FIGS. 8A and 8B are schematic views used to explain mover orientation calculation information processing in a direction different from the direction, illustrated in FIGS. 6A and 6B, perpendicular to the conveyance direction in the first exemplary embodiment of the present disclosure.
Figure 8B:
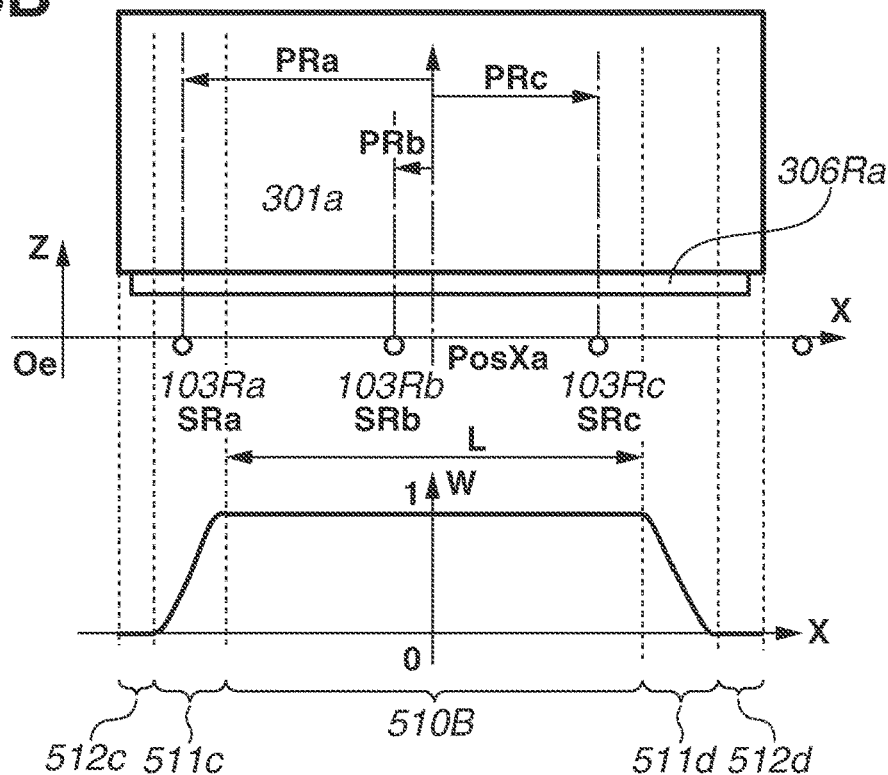

The upper half of each of FIGS. 8A and 8B illustrates a positional relationship between the Z-target 306 (306Ra) mounted on the bottom surface of the mover 301 (301a) and the Z-sensors 103 (103Ra to 103Rc) illustrated in FIG. 1 when the mover 301a is viewed from the minus Z-direction illustrated in FIG. 1. FIG. 8B illustrates a state in which the mover 301a has slightly advanced along the plus X-direction as compared with the state illustrated in FIG. 8A.

For example, with regard to the mover 301a illustrated in FIG. 8A, the mover position information (X) is calculated to be PosXa. Then, based on a relationship between PosXa and SRa, SRb, and SRc, which are pieces of sensor mounting position information 507, three Z-sensors 103Ra, 103Rb, and 103Rc are identified as Z-sensors 103 which are able to measure the mover 301a.

Since it is determined that the Z-sensors 103Ra and 103Rb illustrated in FIG. 8A are present in the sensor information effective region 510B, the coefficients W are calculated as in the following formulae (10) and (11).

$$W(103Ra)=1 \tag{10}$$

$$W(103Rb)=1 \tag{11}$$

Since it is determined that the Z-sensor 103Rc illustrated in FIG. 8A is present in the sensor information ineffective region 512d, the coefficient W is calculated as in the following formula (12).

$$W(103Rc)=0 \tag{12}$$

Similarly, with regard to the mover 301a illustrated in FIG. 8B, the mover position information (X) is calculated to be PosXa, and a plurality of Z-sensors 103Ra, 103Rb, and 103Rc is identified as Z-sensors 103 which are able to measure the mover 301a.

Since it is determined that the Z-sensors 103Rb and 103Rc illustrated in FIG. 8B are present in the sensor information effective region 510B, the coefficients W are calculated as in the following formulae (13) and (14).

$$W(103Rb)=1 \tag{13}$$

$$W(103Rc)=1 \tag{14}$$

Moreover, it is determined that the Z-sensor 103Ra illustrated in FIG. 8B is present in the sensor information load region 511c. In such a case where it is determined that the Z-sensor 103Ra is present in the sensor information load region 511c, a coefficient (W) of greater than or equal to "0" and less than or equal to "1" is calculated. For example, with use of a continuous function which monotonously increases or decreases from "0" to "1" or from "1" to "0", for example, a sigmoid function such as the following formula (15), the coefficient (W) is calculated to be a value of greater than or equal to "0" and less than or equal to "1". In formula (15), "a" is a gain in the sigmoid function. FIG. 7A illustrates a function of the coefficient W. A dashed line in FIG. 7A represents a function of the coefficient (W) in the sensor information load region 511c. Furthermore, a solid line in FIG. 7A represents a function of the coefficient (W) in the sensor information load region 511d. In formula (15), "PRa" is a relative distance between the Z-sensor 103Ra and the mover 301a which is calculated from PosXa, which is mover position information (X), and SRa, which is sensor mounting position information 507 about the Z-sensor 103Ra.

$$W(103Ra)=1/(1+\exp(-a*PRa)) \quad (15)$$

With use of the above-mentioned coefficients (W) calculated by the mover orientation calculation information processing function 502, orientation information about the mover 301 is obtained by the mover orientation calculation function 503. This allows calculating the orientation of the mover 301 while continuously changing an effective state and an ineffective state of the sensor information. This makes it possible to prevent or reduce discontinuous variations of detection positions and orientations occurring when sensors used to calculate the mover information 506 are switched due to the conveyance of the mover 301.

Figure 7B:
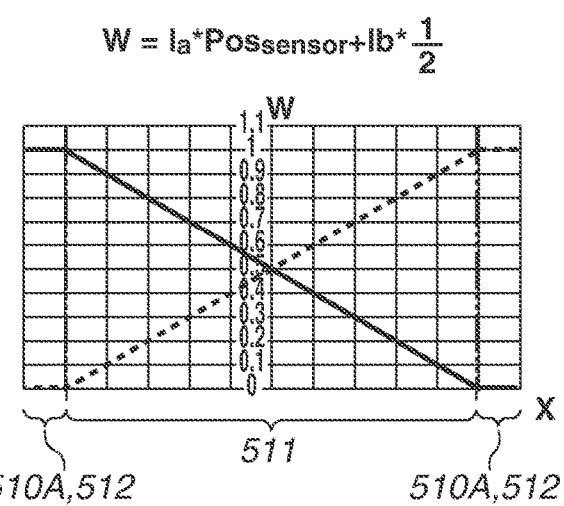
Figure 7C:
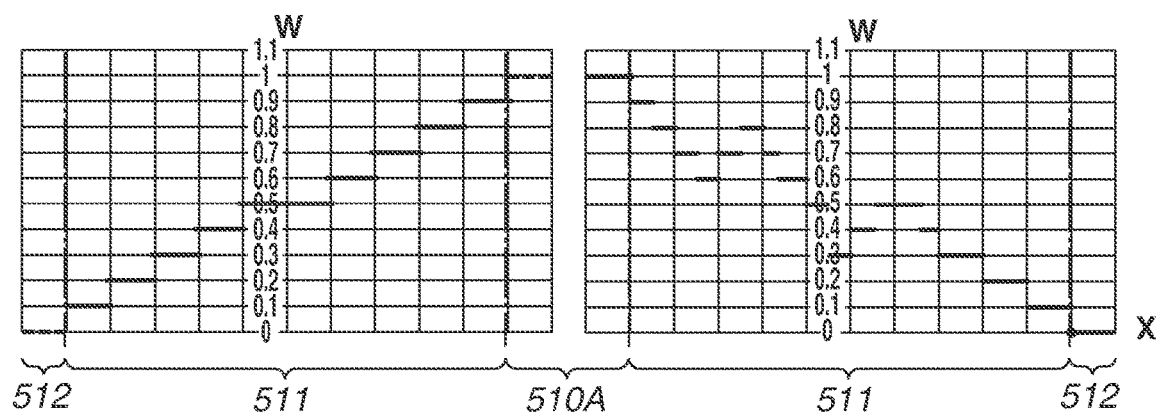
Figure 7D:
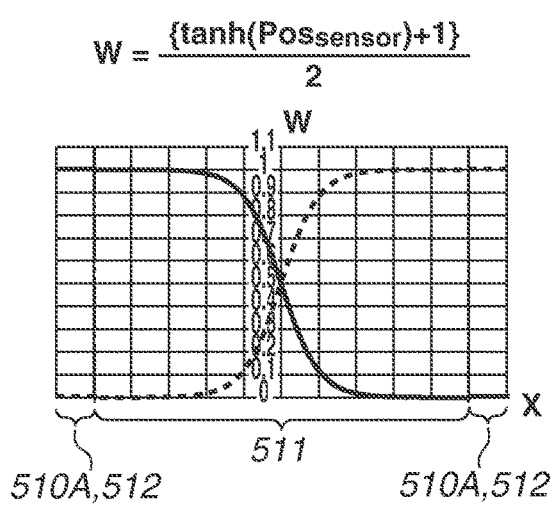
Figure 7E:
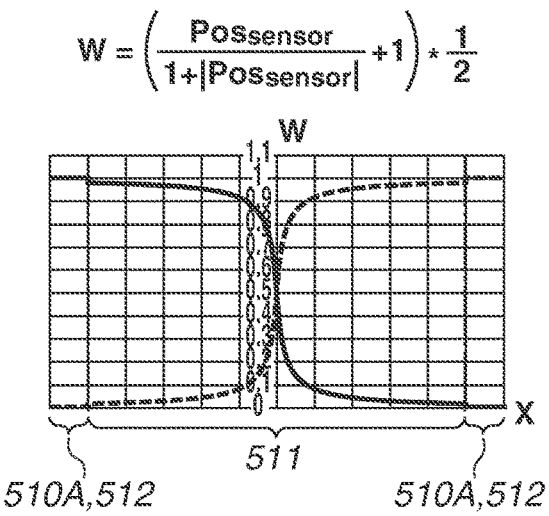

Furthermore, the function for calculating coefficients (W) can be, instead of the above-mentioned sigmoid function, a linear function such as that illustrated in FIG. 7B or a discontinuous function which changes coefficients (W) in a stepwise fashion, such as that illustrated in FIG. 7C. Moreover, the function for calculating coefficients (W) can also be instead a hyperbolic function such as those illustrated in FIG. 7D and FIG. 7E. The sigmoid function illustrated in FIG. 7A is able to smoothly change the coefficient (W) in the range of values from "0" to "1", and the rate of change thereof can be varied by adjustment of the gain. On the other hand, the linear function illustrated in FIG. 7B is uniquely determined by the sensor information load region 511 and is configured with only the four basic arithmetic operators, thus being able to be processed at high speed. Moreover, the discontinuous function illustrated in FIG. 7C is able to be retained, for example, on a memory of the integrated controller 401 as a profile of coefficients and is able to be implemented without calculation processing for coefficients, thus being also able to set a profile of complicated coefficients other than those for the above-mentioned functions. Furthermore, PosSensor shown in FIGS. 7A to 7E is a relative distance between each sensor and the mover 301 which is calculated from the mover position information (X) and the sensor mounting position information 507.

Particularly, the discontinuous function which changes coefficients (W) in a stepwise fashion, such as that illustrated in FIG. 7C, is retained on a memory of the integrated controller 401 as a coefficient profile including coefficients (W) calculated from positional relationships between the mover 301 and the respective sensors 102 and 103. This allows making a configuration for performing processing similar to that performed by the mover orientation calculation information processing function 502.

The mover orientation calculation information processing function 502 calculates coefficients (W) from the mover position information (X) included in the mover information 506 and the sensor mounting position information 507. The mover orientation calculation information processing function 502 outputs mover orientation calculation information 508 with the calculated coefficients (W) added thereto, and then inputs such mover orientation calculation information 508 together with the mover information 506 to the mover orientation calculation function 503.

Next, processing which is performed by the mover orientation calculation function 503 is described with reference to FIG. 9 and FIGS. 10A and 10B.

Figure 9:
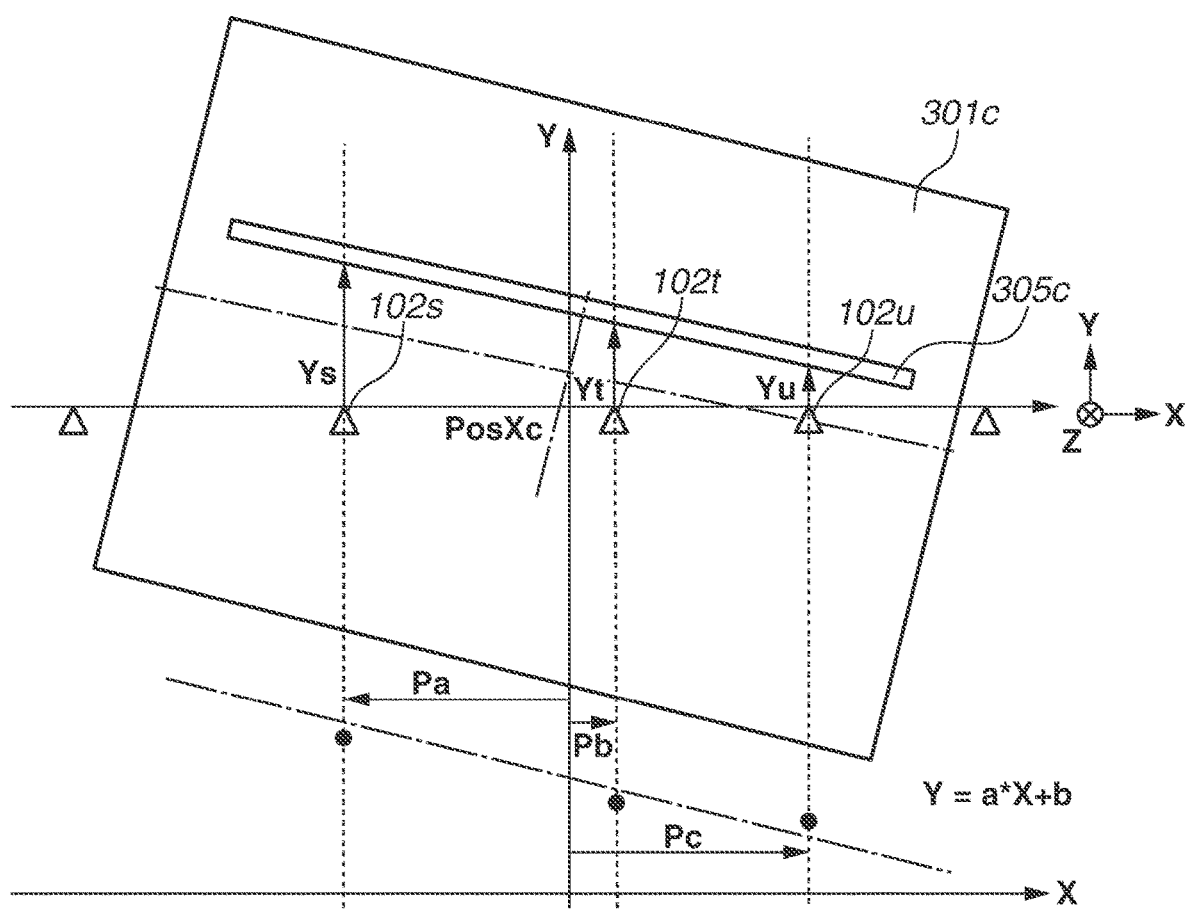
FIG. 9 is a schematic view used to explain mover orientation calculation processing in a direction perpendicular to the conveyance direction in the first exemplary embodiment of the present disclosure.

FIG. 9 illustrates a case where a mover 301c is conveyed as the mover 301 and Y-sensors 102s, 102t, and 102u are arranged as the Y-sensors 102. Three Y-sensors 102s, 102t, and 102u are facing a Y-target 305c of the mover 301c illustrated in FIG. 9. Values of relative distances which three Y-sensors 102s, 102t, and 102u output are denoted by Ys, Yt, and Yu, and measurement values (detection values) are shown by filled circles in FIG. 9. Then, the position Y and the amount of rotation Wz around the Z-axis of the mover 301c can be considered as the inclination of the regression line and the intercept thereof.

Parameters of the regression line Y=a*X+b, which is mover position information (Y, Wz), are obtained by, for example, calculating "a" and "b" which minimize a square error with a load applied thereto shown in the following formula (16) with use of the least-square method. In this case, the inclination "a" of the regression line becomes tan(Wz), and the intercept "b" thereof becomes the position Y. Moreover, in formula (16), Ws, Wt, and Wu are coefficients of the respective Y-sensors 102s, 102t, and 102u included in the mover orientation calculation information 508.

$$Ws*(Ys-(a*Ps+b))^2+Wt*(Yt-(a*R+b))^2+Wu*(Yu-(a*Pu+b))^2 \quad (16)$$

Moreover, while, if at least two Y-sensors 102 are facing the mover 301, it is possible to calculate the mover position information (Y, Wz) about the mover 301, as mentioned above, depending on positions of the mover 301, three or more Y-sensors 102 may in some cases be facing the mover 301. Even in such cases, it is possible to calculate the inclination of the Y-target 305, i.e., the amount of rotation Wz around the Z-axis, and the position Y of the mover 301 with use of, for example, the least-square method in a similar way.

Furthermore, it is desirable that the Y-sensors 102 be arranged on the stator 201 along the conveyance direction (X-direction) in such a manner that at least two Y-sensors 102 are present in the sensor information effective region 510A, to which a coefficient (W) of "1" is assigned, from the viewpoint of the orientation detection accuracy for the mover 301. Thus, it is favorable that the distance between adjacent Y-sensors 102 is less than or equal to one half of the length K of the sensor information effective region 510A in the X-direction (see FIGS. 6A and 6B).

Figure 10A:
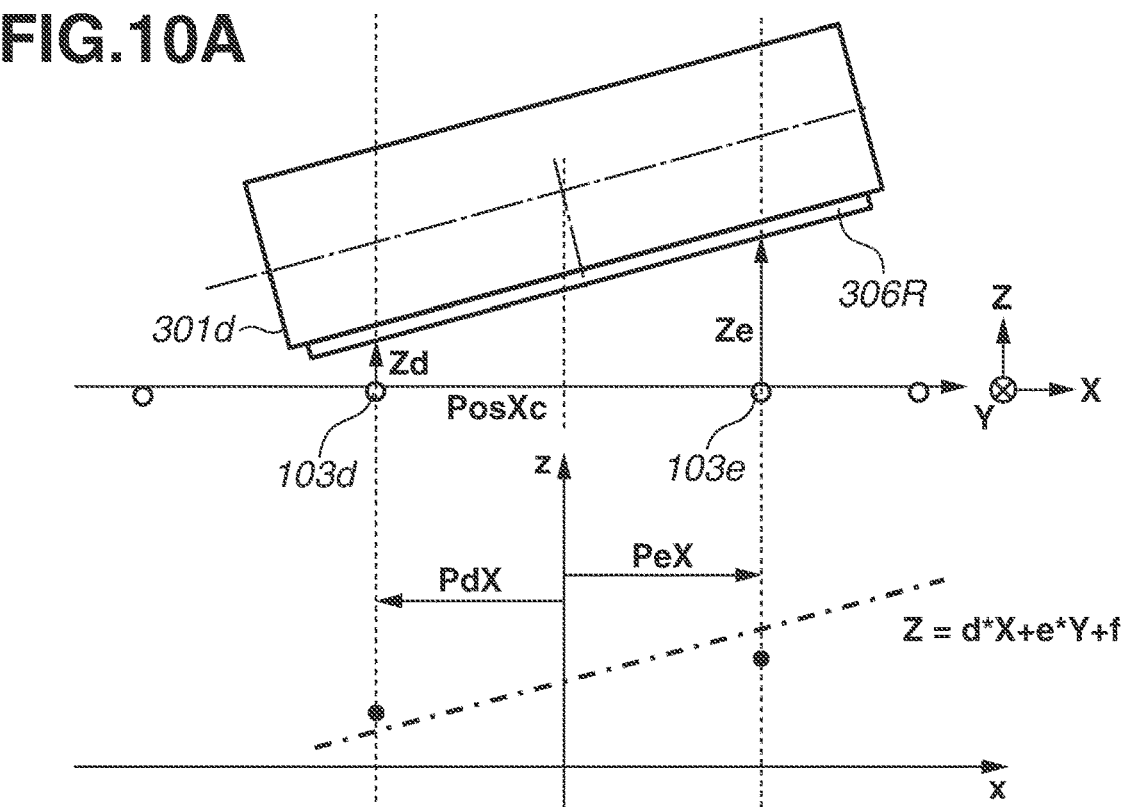
FIGS. 10A and 10B are schematic views used to explain mover orientation calculation processing in a direction different from the direction, illustrated in FIG. 9, perpendicular to the conveyance direction in the first exemplary embodiment of the present disclosure.
Figure 10B:
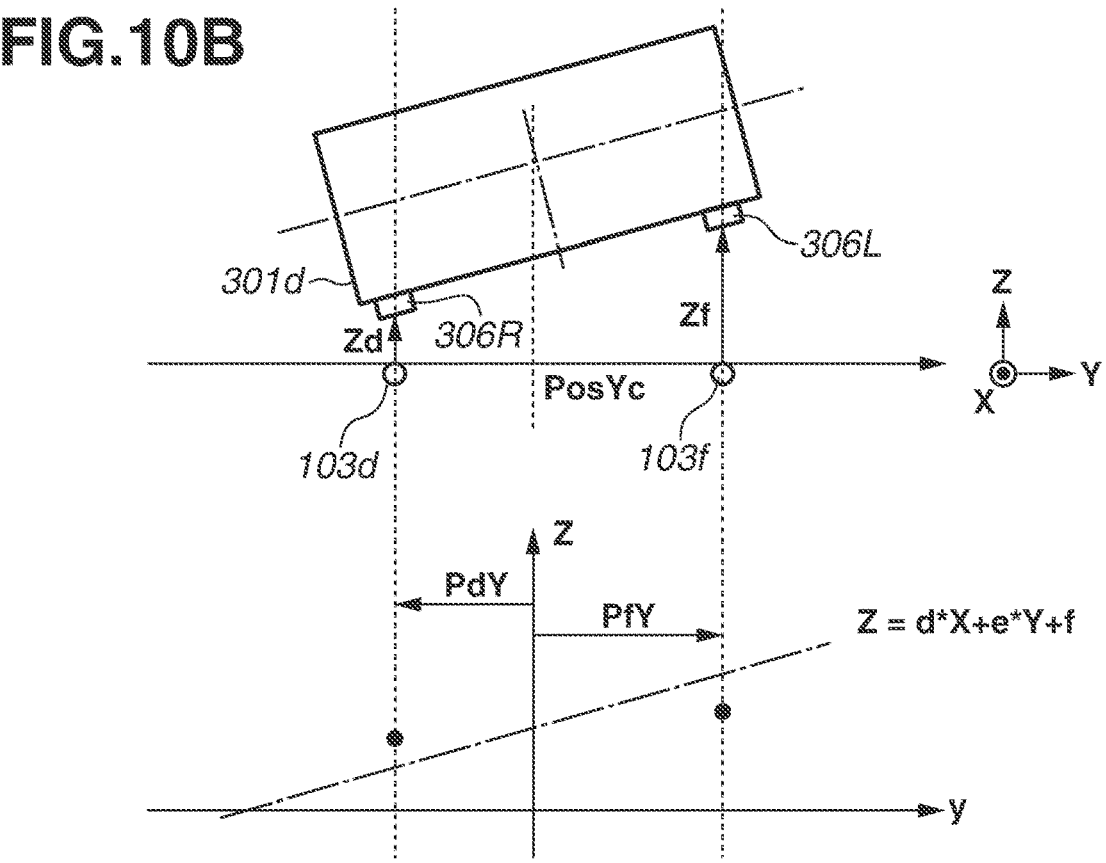

Moreover, FIGS. 10A and 10B illustrate a case where a mover 301d is conveyed as the mover 301 and Z-sensors 103d, 103e, and 103f are arranged as the Z-sensors 103. Three Z-sensors 103d, 103e, and 103f are facing the Z-targets 306 of the mover 301d illustrated in FIGS. 10A and 10B. Here, values of relative distances which three Z-sensors 103d, 103e, and 103f output are denoted by Zd, Ze, and Zf, and measurement values are shown by filled circles in FIGS. 10A and 10B. Then, the position Z, the amount of rotation Wy around the Y-axis, and the amount of rotation Wx around the X-axis of the mover 301d can be obtained as the respective parameters of the regression plane.

Parameters of the regression plane Z=d*X+e*Y+f, which is mover position information (Z, Wx, Wy), are obtained by, for example, calculating "d", "e", and "f" which minimize a square error with a load applied thereto shown in the following formula (17) with use of the least-square method. In this case, "d" becomes tan(Wy), "e" becomes tan(Wx), and "f" becomes the position Z. Moreover, in formula (17), Wd, We, and Wf are coefficients of the respective Z-sensors 103d, 103e, and 103f included in the mover orientation calculation information 508.

$$Wd*(Zd-(d*PdX+e*PdY+f))^2+We*(Ze-(d*PeX+e*PeY+f))^2+Wf*(Zf-(d*PfX+e*PfY+f))^2 \quad (17)$$

Moreover, depending on positions of the mover 301, four or more Z-sensors 103 may in some cases be facing the mover 301. Even in such cases, it is possible to calculate the inclination of the Z-target 306, i.e., the amount of rotation Wx around the X-axis and the amount of rotation Wy around the Y-axis, and the position Z of the mover 301 with use of, for example, the least-square method in a similar way.

Furthermore, it is desirable that the Z-sensors 103 be arranged along the conveyance direction (X-direction) in such a manner that at least one Z-sensor 103 is present at one of the R-side and the L-side and at least two Z-sensors 103 are present at the other of the R-side and the L-side in the sensor information effective region 510B, to which a coefficient (W) of "1" is assigned, from the viewpoint of the orientation detection accuracy for the mover 301. While, in the first exemplary embodiment, an example in which at least two Z-sensors 103 are present at the R-side and at least one Z-sensor is present at the L-side has been illustrated, at least two Z-sensors 103 can be present at the L-side and at least one Z-sensor can be present at the R-side. Thus, to arrange at least two Z-sensors 103 in the sensor information effective region 510B, it is favorable that the distance between adjacent Z-sensors 103 is less than or equal to one half of the length L of the sensor information effective region 510B in the X-direction (see FIGS. 8A and 8B). To arrange at least one Z-sensor 103 in the sensor information effective region 510B, it is favorable that the distance between adjacent Z-sensors 103 is less than or equal to the length L of the sensor information effective region 510B in the X-direction (see FIGS. 8A and 8B).

The mover orientation calculation function 503 is able to calculate, as orientation information about the mover 301, the position Y, the position Z, and the amounts of rotation Wx, Wy, and Wz around the respective axes in the above-described way.

The mover orientation control function 504 calculates a force T, which is to be applied to the mover 301, with use of the mover information 506 calculated as described above, and the coil current calculation function 505 determines the amounts of currents, which are to be applied to the respective coils 202, based on the forces acting on the respective permanent magnets 303.

Next, processing which is performed by the coil current calculation function 505 is described with reference to FIG. 2B. Furthermore, with regard to expression of forces which are used in the following description, directions in which forces in the X-direction, the Y-direction, and the Z-direction act are represented by "x", "y", and "z", respectively, and, in FIG. 2B, the R-side, which is a side in the plus Y-direction, is represented by R, the L-side, which is a side in the minus Y-direction, is represented by L, a side in the plus X-direction is represented by "f", and a side in the minus X-direction is represented by "b".

In FIG. 2B, forces which act on the respective permanent magnets 303 at the R-side and the L-side are expressed as follows. The forces which act on the respective permanent magnets 303 are electromagnetic forces which the permanent magnets 303 receive from a plurality of coils 202 to which currents have been applied. The permanent magnets 303 receive, in addition to electromagnetic forces acting in the X-direction, which is the conveyance direction of the mover 301, electromagnetic forces acting in the Y-direction and the Z-direction, which are directions different from the X-direction, from a plurality of coils 202 to which currents have been applied.

Forces acting on the permanent magnet 303 at the R-side are expressed as follows:
FzfR: force acting on the permanent magnet 303$b$R at the R-side in the Z-direction;
FxfR: force acting on the permanent magnet 303$b$R at the R-side in the X-direction;
FyfR: force acting on the permanent magnet 303$a$R at the R-side in the Y-direction;
FxbR: force acting on the permanent magnet 303$c$R at the R-side in the X-direction;
FybR: force acting on the permanent magnet 303$d$R at the R-side in the Y-direction; and
FzbR: force acting on the permanent magnet 303$c$R at the R-side in the Z-direction.

Forces acting on the permanent magnet 303 at the L-side are expressed as follows:
FzfL: force acting on the permanent magnet 303$b$L at the L-side in the Z-direction;
FxfL: force acting on the permanent magnet 303$b$L at the L-side in the X-direction;
FyfL: force acting on the permanent magnet 303$a$L at the L-side in the Y-direction;
FxbL: force acting on the permanent magnet 303$c$L at the L-side in the X-direction;
FybL: force acting on the permanent magnet 303$d$L at the L-side in the Y-direction; and
FzbL: force acting on the permanent magnet 303$c$L at the L-side in the Z-direction.

Moreover, a force T which is to be applied to the mover 301 is expressed by the following formula (18). Furthermore, Tx, Ty, and Tz are three-axis components of force and are an X-direction component of force, a Y-direction component of force, and a Z-direction component of force, respectively. Moreover, Twx, Twy, and Twz are three-axis components of moment and are a component around the X-axis of moment, a component around the Y-axis of moment, and a component around the Z-axis of moment, respectively. The conveyance apparatus 1 according to the first exemplary embodiment controls conveyance of the mover 301 while controlling the orientation of the mover 301 with six axes by controlling the six-axis components (Tx, Ty, Tz, Twx, Twy, Twz) of the force T.

$$T=(Tx,Ty,Tz,Twx,Twy,Twz) \qquad (18)$$

Then, the components Tx, Ty, Tz, Twx, Twy, and Twz are calculated according to the following formulae (19a), (19b), (19c), (19d), (19e), and (19f).

$$Tx=FxfR+FxbR+FxfL+FxbL \qquad (19a)$$

$$Ty=FyfL+FyfR+FybL+FybR \qquad (19b)$$

$$Tz=FzbR+FzbL+FzfR+FzfL \qquad (19c)$$

$$Twx=\{(FzfL+FzbL)-(FzfR+FzbR)\}*rx3 \qquad (19d)$$

$$Twy=\{(FzfL+FzfR)-(FzbL+FzbR)\}*ry3 \qquad (19e)$$

$$Twz=\{(FyfL+FyfR)-(FybL+FybR)\}*rz3 \qquad (19f)$$

At this time, with respect to forces acting on the permanent magnets 303, restrictions expressed by the following formulae (19g), (19h), (19i), and (19j) can be introduced. Introducing these restrictions allows uniquely determining a combination of forces acting on the permanent magnets 303 to obtain a predetermined force T having six-axis components.

$$FxfR=FxbR=FxfL=FxbL \quad (19g)$$

$$FyfL=FyfR \quad (19h)$$

$$FybL=FybR \quad (19i)$$

$$FzbR=FzbL \quad (19j)$$

Next, a method in which the coil current calculation function 505 determines the amounts of currents, which are to be applied to the respective coils 202, from the forces acting on the respective permanent magnets 303.

First, the case of applying forces in the Z-direction to the permanent magnets 303a and 303d, each of which has polarities of north pole and south pole alternately arranged side by side in the Y-direction, is described. Furthermore, each coil 202 is arranged in such a manner that the center in the Z-direction thereof is located at the center in the Y-direction of each of the permanent magnets 303a and 303d. With this arrangement, almost no forces acting in the X-direction and the Z-direction on the permanent magnets 303a and 303d are generated.

Suppose that, when X is the position of the mover 301 and "j" is a number of each of the coils 202 arranged in line, the magnitude of a force acting in the Y-direction of the coil 202(j) per unit current is denoted by Fy(j, X) and a current to be applied to the coil 202(j) is denoted by i(j). Furthermore, the coil 202(j) is the j-th coil 202. In this case, the current i(j) is able to be determined in such a way as to satisfy the following formula (20). Furthermore, the following formula (20) is a formula concerning the permanent magnet 303dR. With regard to the other permanent magnets 303aR, 303aL, and 303dL, a current to be applied to each coil 202 can also be determined in a similar way.

$$\Sigma Fy(j,X)*i(j)=FybR \quad (20)$$

Furthermore, in a case where a plurality of coils 202 exerts forces on the permanent magnets 303, prorating currents by the magnitude of a force per unit current according to the force exerted by each coil 202 allows uniquely determining a force acting on each permanent magnet 303.

Moreover, as illustrated in FIG. 2B, the permanent magnets 303 are symmetrically arranged at the L-side and the R-side of the mover 301. Such a symmetrical arrangement of the permanent magnets 303 allows canceling out multi-component forces acting on the permanent magnets 303, such as forces for the rotation Wx acting on the permanent magnets 303a and 303d, i.e., moment components around the X-axis, by forces acting at the L-side and the R-side. As a result, it becomes possible to control the orientation of the mover 301 with a higher degree of accuracy.

Figure 13A:
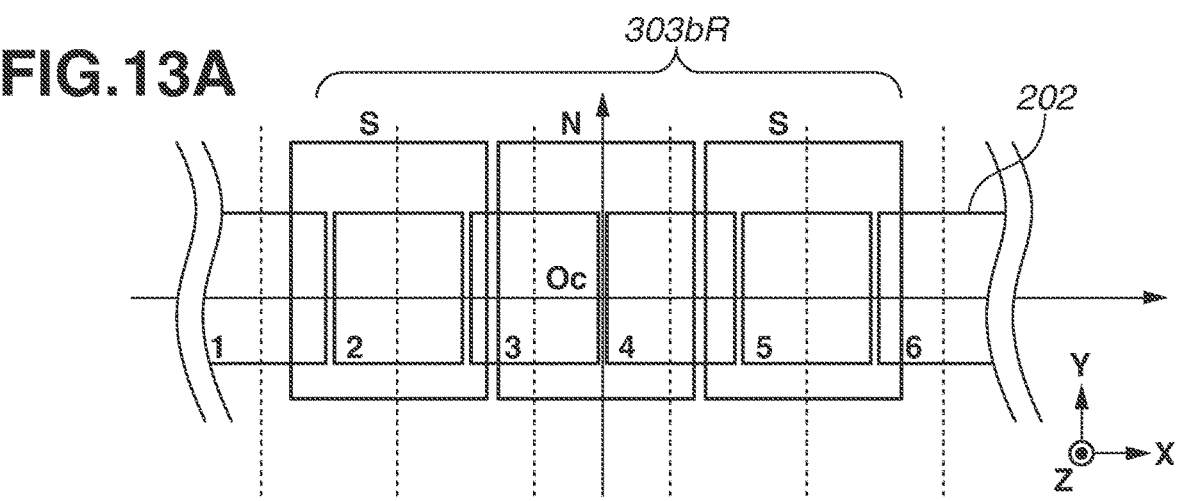
FIGS. 13A, 13B, and 13C are schematic views illustrating a method of independently applying forces to a permanent magnet in an X-direction and a Z-direction in the first exemplary embodiment of the present disclosure.
Figure 13B:
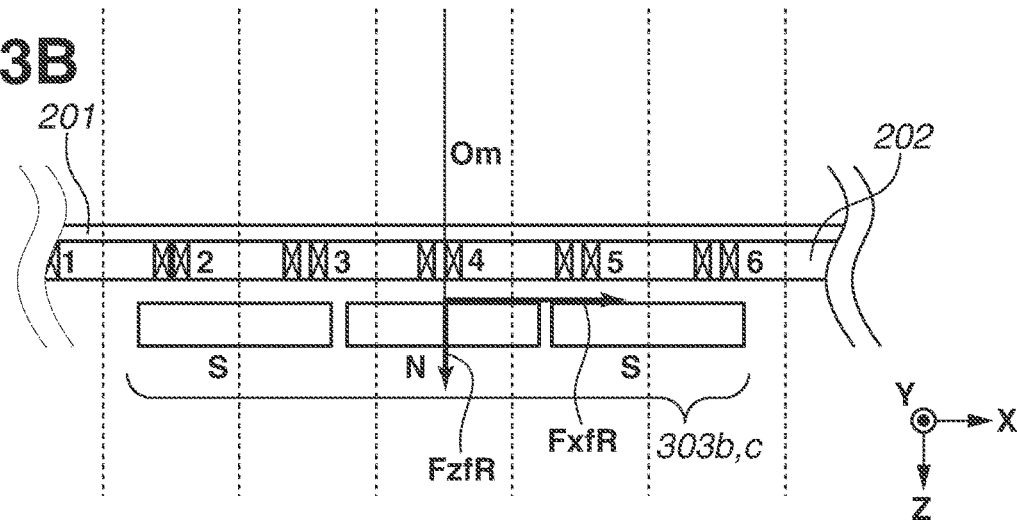
Figure 13C:
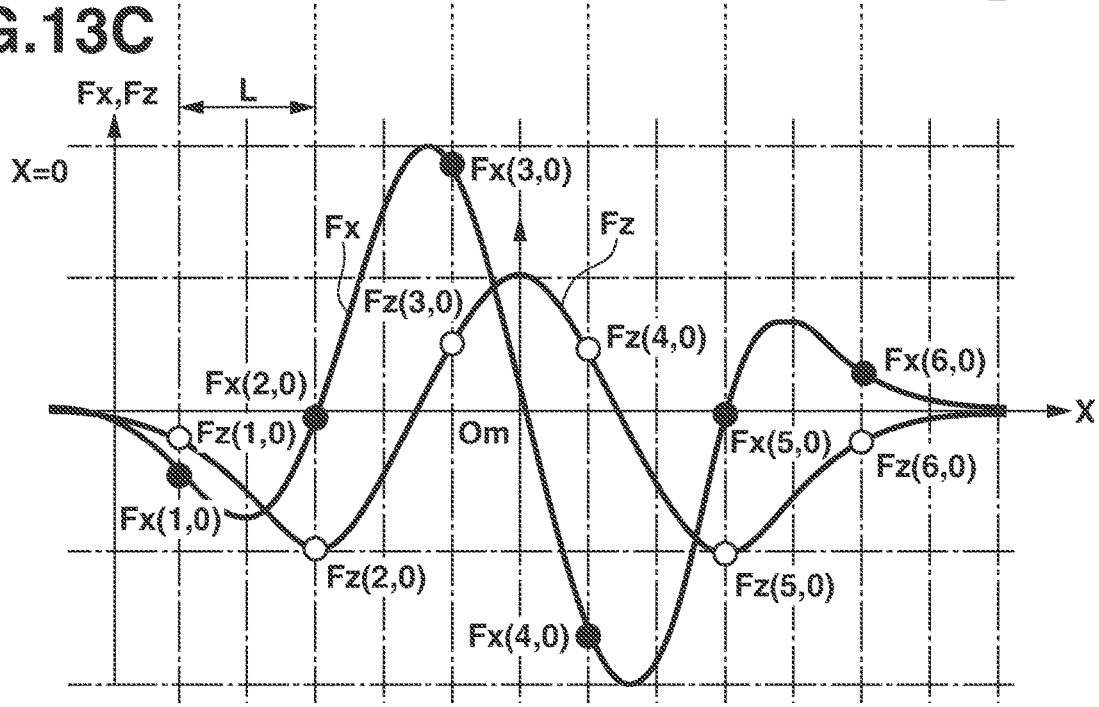

Next, a method of independently applying forces in the X-direction and the Z-direction to the permanent magnet 303b, which has polarities of north pole, south pole, and north pole alternately arranged side by side in the X-direction, is described. FIGS. 13A, 13B, and 13C are schematic views used to explain a method of independently applying forces in the X-direction and the Z-direction to the permanent magnet 303b. The coil current calculation function 505 determines current instruction values, which are to be applied to the coils 202, to independently apply forces in the X-direction and the Z-direction to the permanent magnet 303b, according to the following way. Furthermore, it is also possible to independently apply forces in the X-direction and the Z-direction to the permanent magnet 303c, as with the permanent magnet 303b.

Suppose that, when X is the position of the mover 301 and "j" is a number of each of the coils 202 arranged in line, the magnitudes of forces acting in the X-direction and the Z-direction of the coil 202(j) per unit current are denoted by Fx(j, X) and Fz(j, X), respectively. Moreover, suppose that the magnitude of a current to be applied to the coil 202(j) is denoted by i(j). Furthermore, the coil 202(j) is the j-th coil 202.

FIG. 13A is a diagram illustrating, with the X-axis set as the horizontal axis and the Y-axis set as the vertical axis, six coils 202 facing the permanent magnet 303bR in an extracted manner. FIG. 13B is a diagram of such six coils 202 facing the permanent magnet 303b as viewed from the Y-direction in FIG. 13A. The coils 202 are assigned the respective numbers "j" from "1" to "6" in the order of side-by-side arrangement in the X-direction, and, in the following description, each coil 202 is identified by being expressed as, for example, "coil 202(1)".

As illustrated in FIGS. 13A and 13B, the coils 202 are arranged at a pitch of distance L. On the other hand, the permanent magnets 303 of the mover 301 are arranged at a pitch of distance "3/2*L".

FIG. 13C is a graph schematically illustrating the magnitudes of a force Fx in the X-direction and a force Fz in the Z-direction occurring when unit currents are applied to the respective coils 202 illustrated in FIGS. 13A and 13B.

For ease of explanation, in FIGS. 13A to 13C, the origin Oc of positions in the X-direction of the coils 202 is set at a middle point between the coil 202(3) and the coil 202(4), and the center Om in the X-direction of the permanent magnet 303bR is set as the origin. Therefore, FIGS. 13A to 13C illustrate a case where the origin Oc and the center Om coincide with each other, i.e., the case of X=0.

At this time, for example, the magnitudes of forces per unit current acting on the coil 202(4) are Fx(4, 0) in the X-direction and Fz(4, 0) in the Z-direction. Moreover, the magnitudes of forces per unit current acting on the coil 202(5) are Fx(5, 0) in the X-direction and Fz(5, 0) in the Z-direction.

Here, suppose that current values to be applied to the coils 202(1) to 202(6) are denoted by i(1) to i(6), respectively. Then, the magnitude FxfR of a force acting in the X-direction and the magnitude FzfR of a force acting in the Z-direction on the permanent magnet 303bR are generally expressed by the following formulae (21) and (22), respectively.

$$FxfR=Fx(1,X)*i(1)+Fx(2,X)*i(2)+Fx(3,X)*i(3)+Fx(4,X)*i(4)+Fx(5,X)*i(5)+Fx(6,X)*i(6) \quad (21)$$

$$FzfR=Fz(1,X)*i(1)+Fz(2,X)*i(2)+Fz(3,X)*i(3)+Fz(4,X)*i(4)+Fz(5,X)*i(5)+Fz(6,X)*i(6) \quad (22)$$

Determining current instruction values in such way as to apply the current values i(1) to i(6) satisfying the above-mentioned formulae (21) and (22) to the coils 202(1) to 202(6), respectively, allowing independently applying forces in the X-direction and the Z-direction to the permanent magnet 303bR. The coil current calculation function 505 is able to determine current instruction values, which are to be applied to the coils 202(j), in the above-described way to independently apply forces in the X-direction and the Z-direction to the permanent magnet 303b.

For more ease of explanation, in the situation illustrated in FIGS. 13A to 13C, consider, for example, the case of using only the coils 202(3), 202(4), and 202(5) out of the coils 202(1) to 202(6) with respect to the permanent magnet 303bR and performing control in such a manner that the sum of current values to be applied to such three coils become "0". In the case of this example, the magnitude FxfR of a force acting in the X-direction and the magnitude FzfR of a force acting in the Z-direction on the permanent magnet 303bR are expressed by the following formulae (23) and (24), respectively.

$$FxfR=Fx(3,X)*i(3)+Fx(4,X)*i(4)+Fx(5,X)*i(5) \quad (23)$$

$$FzfR=Fz(3,X)*i(3)+Fz(4,X)*i(4)+Fz(5,X)*i(5) \quad (24)$$

Moreover, current values to be applied to the coils 202(1) to 202(6) can be set in such a way as to satisfy the following formulae (25) and (26).

$$i(3)+i(4)+i(5)=0 \quad (25)$$

$$i(1)=i(2)=i(6)=0 \quad (26)$$

Accordingly, in a case where the magnitudes (FxfR and FzfR) of forces required to act on the permanent magnet 303bR have been determined, it is possible to uniquely determine the current values i(1), i(2), i(3), i(4), i(5), and i(6). The current instruction values determined in the above-described way cause forces in the X-direction and the Z-direction to be applied to the mover 301. The force in the X-direction applied to the mover 301 causes the mover 301 to receive a driving force for movement in the X-direction and thus move in the X-direction. Moreover, the forces in the X-direction and the Z-direction applied to the mover 301 in response to the current instruction values determined in the above-described way cause the mover 301 to be controlled with respect to the orientation thereof.

In this way, the integrated controller 401 controls currents which are to be applied to a plurality of coils 202 and thus controls each of six-axis components of a force to be applied to the mover 301.

Furthermore, in a case where the center Oc of the coils 202 has moved relative to the center Om of the permanent magnet 303bR due to conveyance of the mover 301, i.e., in the case of X≠0, it is possible to select coils 202 corresponding to the moved position. Additionally, it is possible to perform a calculation similar to that described above based on a force per unit current occurring at each coil 202.

In the above-described way, the integrated controller 401 determines current instruction values for currents which are to be applied to a plurality of coils 202 and performs control based on the determined current instruction values, thus controlling conveyance of the mover 301 on the stator 201 in a non-contact manner while controlling the orientation of the mover 301 on the stator 201 with six axes. Thus, the integrated controller 401 functions as a conveyance control unit which controls conveyance of the mover 301, and controls conveyance of the mover 301 on the stator 201 in a non-contact manner by controlling electromagnetic forces which the permanent magnets 303 receive from a plurality of coils 202. Moreover, the integrated controller 401 functions as an orientation control unit which controls the orientation of the mover 301, and controls the orientation of the mover 301 on the stator 201 with six axes. Furthermore, the whole or a part of the functions of the integrated controller 401 serving as a control device can be replaced with another control device such as the coil controller 402.

In this way, according to the first exemplary embodiment, a plurality of coils 202 arranged in two lines is able to be used to apply a six-axis force including three-axis force components (Tx, Ty, Tz) and three-axis moment components (Twx, Twy, Twz) to the mover 301. This allows controlling conveyance of the mover 301 while controlling the orientation of the mover 301 with six axes. According to the first exemplary embodiment, coils 202 arranged in two lines, the number of which is less than the number of six-axis components of a force serving as variables to be controlled, are able to be used to control conveyance of the mover 301 while controlling the orientation of the mover 301 with six axes.

Therefore, according to the first exemplary embodiment, since the number of lines of coils 202 can be configured to be small, it is possible to convey the mover 301 in a non-contact manner while controlling the orientation of the mover 301 without involving an increase in size or a complication of the system. Additionally, according to the first exemplary embodiment, since the number of lines of coils 202 can be configured to be small, it is possible to configure a small-sized magnetic levitation-type conveyance system at low cost.

Moreover, according to the first exemplary embodiment, since the permanent magnets 303 are arranged on the upper surface of the mover 301, it is possible to implement a good access to work 302. This allows a process apparatus to perform a processing operation on the work 302 placed on the mover 301 at a high degree of freedom.

Next, advantageous or beneficial effects of the first exemplary embodiment are described with use of an example of detection using the Y-sensors 102 illustrated in FIGS. 11A, 11B, 11C, 11D, and 11E.

Figure 11A:
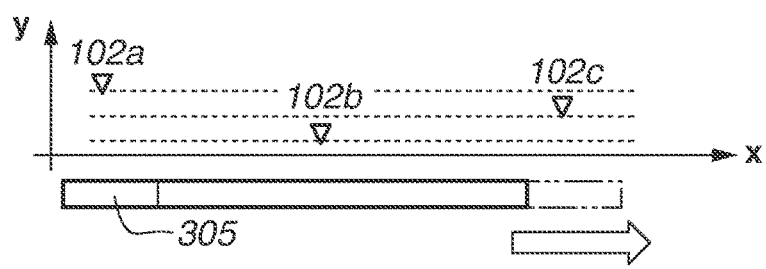
FIGS. 11A, 11B, 11C, 11D, and 11E are schematic views used to explain advantageous or beneficial effects of the first exemplary embodiment of the present disclosure.

FIG. 11A illustrates a manner in which, along with the mover 301 (not illustrated) being conveyed, the Y-target 305 mounted on the mover 301 is moving, and a plurality of Y-sensors 102a, 102b, and 102c differ in sensor mounting position due to variations in sensor mounting accuracy.

As illustrated in FIGS. 11B to 11E, along with the mover 301 being conveyed, the Y-sensor 102c starts to detect the Y-target 305 anew at the position PosXa illustrated therein.

Figure 11B:
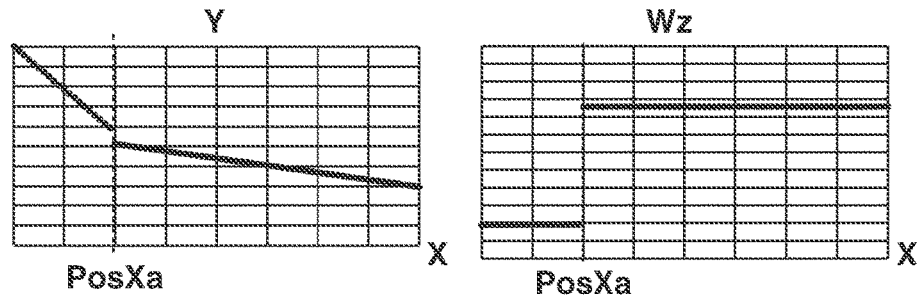

FIG. 11B illustrates calculation results of mover position information (Y, Wz) obtained by a conventional technique in which no sensor information load regions 511 are provided. Switching between the Y-sensors 102 in this technique causes the calculation results of mover position information (Y, Wz) to greatly vary in a discontinuous manner.

Figure 11C:
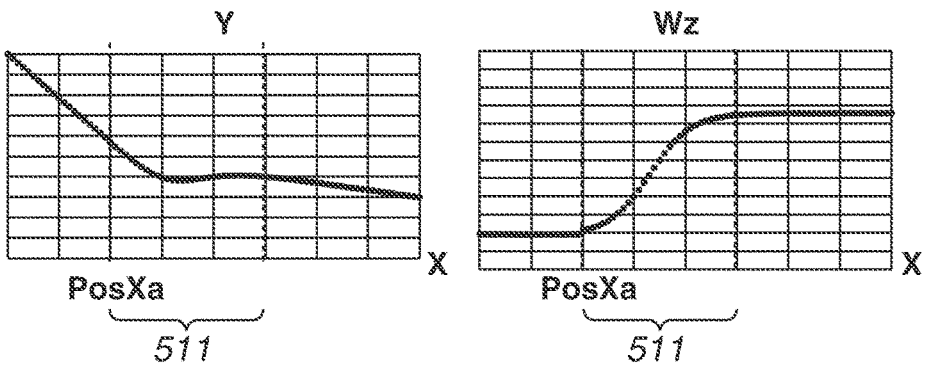
Figure 11D:
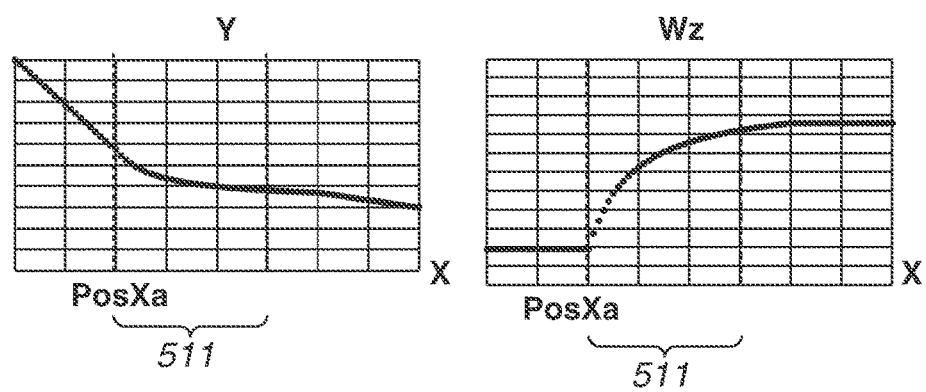
Figure 11E:
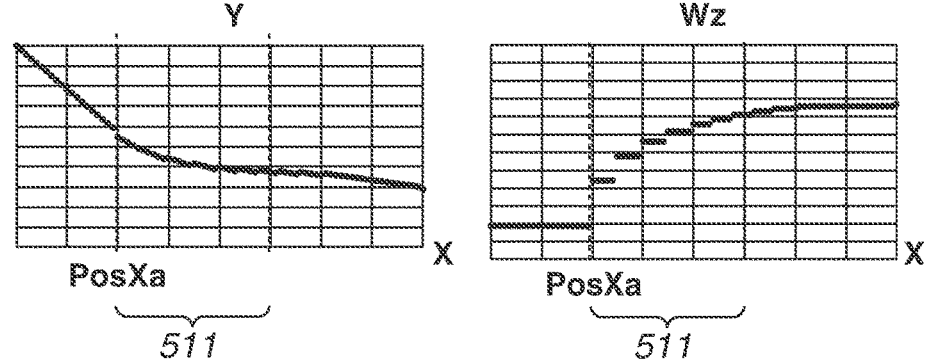

On the other hand, FIG. 11C illustrates calculation results of mover position information (Y, Wz) obtained with use of coefficients (W) calculated by the sigmoid function. Moreover, FIG. 11D illustrates such calculation results obtained with use of coefficients (W) calculated by the linear function, and FIG. 11E illustrates such calculation results obtained with use of coefficients (W) calculated by the discontinuous function such as that illustrated in FIG. 7C. In FIGS. 11C to 11E, in regions indicated by the sensor information load regions 511, the coefficients (W) of the Y-sensor 102c are calculated by the respective functions, so that the calculated coefficients (W) are used to calculate the mover position information (Y, Wz).

It is desirable that the detected position and orientation obtained when detection sensors are switched smoothly vary in such a manner as that illustrated in FIG. 11C from the viewpoint of prevention or reduction of vibrations of the mover 301. However, even if a configuration using the linear function or the discontinuous function is employed due to mounting reasons such as speeding up of calculation processing for mover position information, it becomes possible to reduce the above-mentioned variation to a small one as illustrated in FIGS. 11D and 11E.

Furthermore, sensors which are used for calculation of the mover information 506 are switched one after another along with conveyance of the mover 301. At that time, the mounting positions of sensors serially change in the order of the sensor information ineffective region 512b, the sensor information load region 511b, the sensor information effective region 510A, the sensor information load region 511a, and the sensor information ineffective region 512a along with the coefficients (W). Therefore, according to the first exemplary embodiment, it is possible to reduce a variation of the detected position and orientation, which are obtained when detection sensors are switched, to a small one. Accordingly, it becomes possible to remove vibrations of the mover caused by switching of the detection sensors and to perform stable conveyance of the mover.

Figure 12:
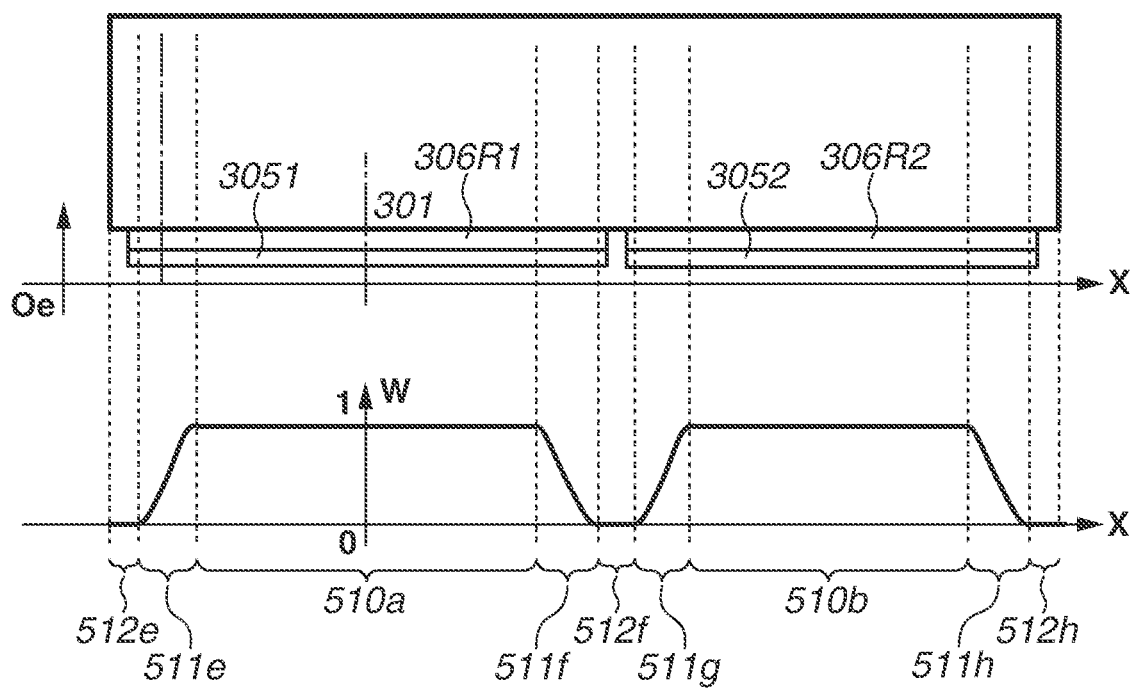
FIG. 12 is a schematic view illustrating, by an example, a different configuration of a mover orientation calculation information processing function in the first exemplary embodiment of the present disclosure.

Furthermore, in the first exemplary embodiment, an example in which the sensor information load regions 511 and the sensor information ineffective regions 512 are provided only at the front and rear portions of the mover 301 has been described. However, depending on configurations of the mover 301, there are, for example, a case where the targets 305 and 306 are arranged while being divided in the conveyance direction and a case where floating or deformation occurs due to variations in mounting accuracy of the targets 305 and 306. At this time, detection operations of the sensors 102 and 103 may become unstable and there may be present a plurality of portions in which the detected error becomes greater than or equal to a predetermined value. In such a case, as illustrated in FIG. 12, the Y-target 305 can be divided into Y-targets 3051 and 3052. Alternatively, the Z-target 306R can be divided into Z-targets 306R1 and 306R2 and the Z-target 306L can be divided into Z-targets 306L1 and 306L2. In conjunction with such divisions, the sensor information effective region 510 is divided and the sensor information load regions 511 and the sensor information ineffective regions 512 are set.

This allows preventing or reducing variations of the detected position and orientation caused by, for example, division of the Y-target 305 or the Z-targets 306.

While, in the first exemplary embodiment, an example in which the conveyance apparatus 1 includes a moving-magnet type linear motor (a moving permanent type linear motor or a movable field type linear motor) has been described, the first exemplary embodiment is not limited to this. The conveyance apparatus 1 can include a movable coil type linear motor (a moving-coil type linear motor or a fixed field type linear motor).

A second exemplary embodiment of the present disclosure is described below with reference to FIGS. 14A, 14B, and 14C to FIGS. 21A and 21B.

Figure 14A:
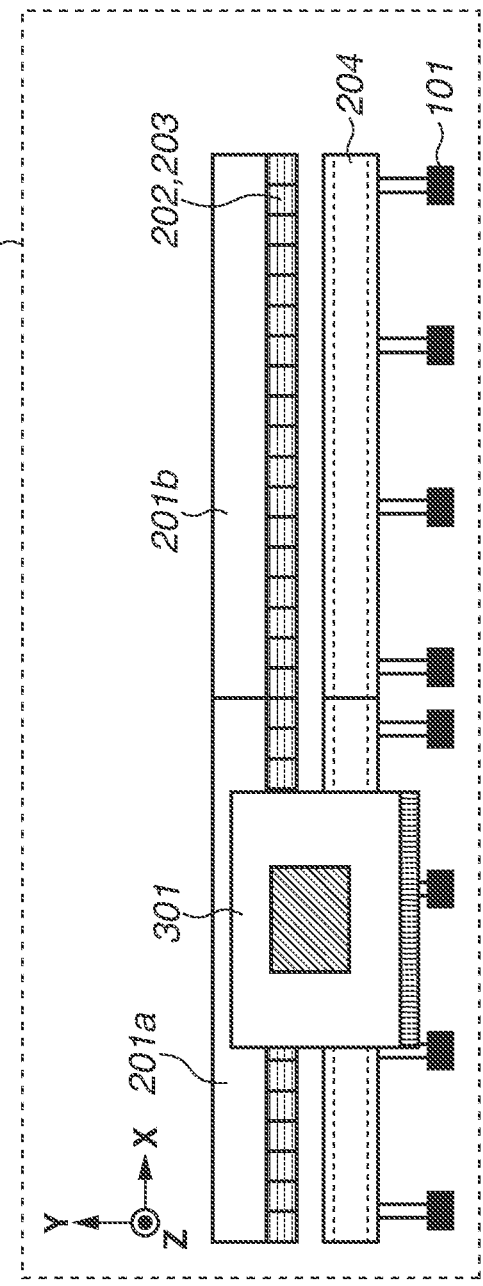
FIGS. 14A, 14B, and 14C are schematic views illustrating the entire conveyance system according to a second exemplary embodiment of the present disclosure.
Figure 14B:
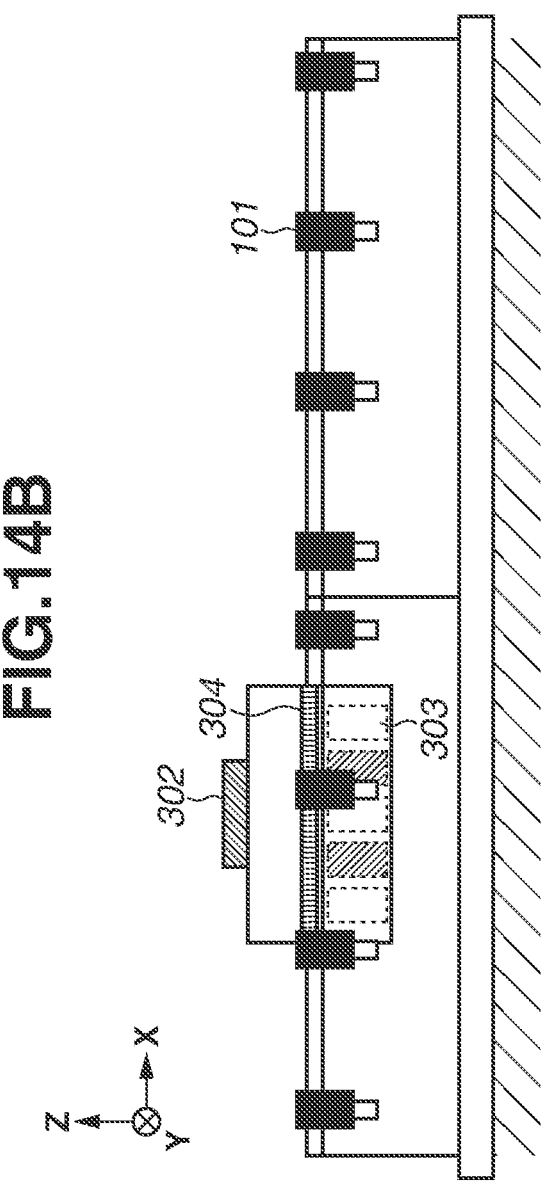
Figure 14C:
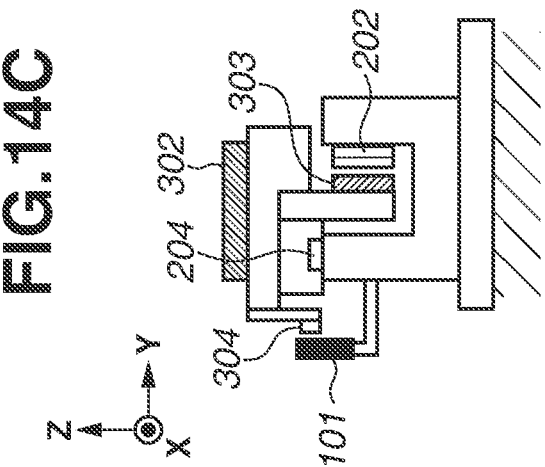

FIGS. 14A to 14C are schematic views illustrating the entire conveyance system according to the second exemplary embodiment. In the conveyance system according to the second exemplary embodiment, the mover 301 is restricted by a guide rail 204 from moving in the Y-direction and the Z-direction. Moreover, the sensors mounted on the stator 201 are only X-sensors 101. In the following description, constituent elements having similar functions to those in the first exemplary embodiment are assigned the respective same reference characters, and the description thereof is omitted here.

A conveyance system 1001 according to the second exemplary embodiment includes a mover 301, which constitutes a dolly, slider, or carriage, a stator 201, which constitutes a conveyance path, and a plurality of X-sensors 101 fixed to the stator 201. The conveyance system 1001 is a conveyance system including a moving-magnet type linear motor (a moving permanent type linear motor or a movable field type linear motor).

Moreover, the mover 301 is restricted by the guide rail 204 from moving in the Y-direction and the Z-direction. While, in the second exemplary embodiment, an example in which the mover 301 is restricted by the guide rail 204 is described, the mover 301 can be configured to be restricted by a guide roller from moving in the Y-direction and the Z-direction.

Each X-sensor 101 is a linear encoder which detects a linear scale 304 mounted on the mover 301 and thus identifies the position of the mover 301 in the conveyance direction.

The plurality of X-sensors 101 is mounted on the stator 201 along the X-direction in such a manner that each X-sensor 101 is able to face the linear scale 304 of the mover 301. Each X-sensor 101 reads the linear scale 304 mounted on the mover 301 and is thus able to detect and output a relative position of the mover 301 with respect to the X-sensor 101.

Figure 15:
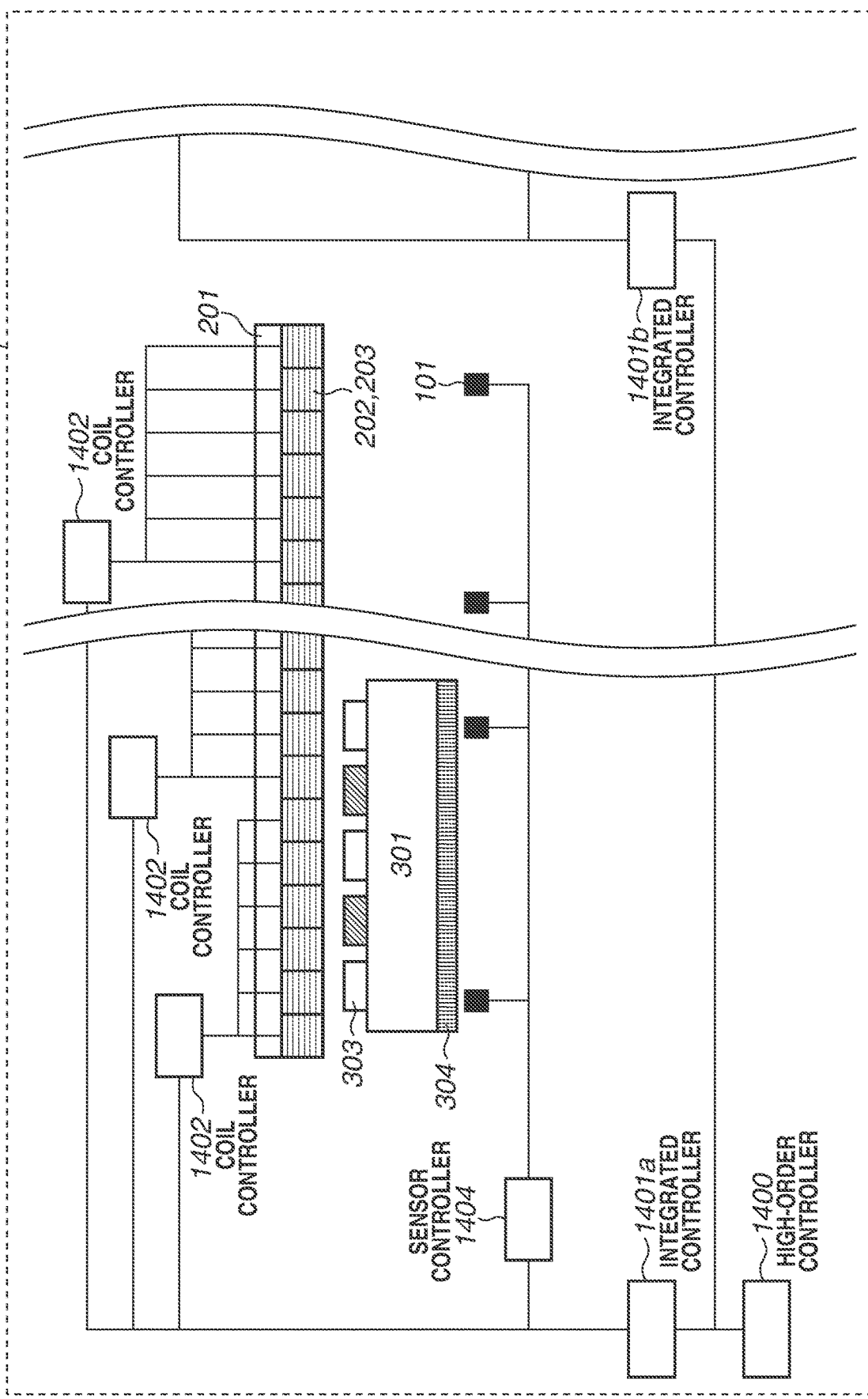
FIG. 15 is a configuration diagram of the conveyance system according to the second exemplary embodiment of the present disclosure.

Next, a control system which controls the conveyance system 1001 according to the second exemplary embodiment is described with further reference to FIG. 15. FIG. 15 is a schematic view illustrating the control system which controls the conveyance system 1001 according to the second exemplary embodiment.

As illustrated in FIG. 15, the control system includes a high-order controller 1400, integrated controllers 1401 (1401a and 1401b), coil controllers 1402, and a sensor controller 1404, and functions as a control device which controls the conveyance system 1001 including the mover 301 and the stator 201. The integrated controllers 1401 are connected to the high-order controller 1400 in such a way as to be able to communicate with the high-order controller 1400. The coil controllers 1402 are connected to the integrated controllers 1401 in such a way as to be able to communicate with the integrated controllers 1401. Moreover, the sensor controller 1404 is connected to the integrated controller 1401 in such a way as to be able to communicate with the integrated controller 1401.

The high-order controller 1400 controls the entire production apparatus including the conveyance system 1001 and a process apparatus, which performs a processing operation on work 302 placed on the mover 301. The high-order controller 1400 transmits, to the integrated controllers 1401, a movement instruction (for example, a moving destination, a moving speed, and a moving acceleration or deceleration) for each mover 301.

A plurality of current controllers 1403 (not illustrated) is connected to the coil controller 1402 in such a way as to be able to communicate with the coil controller 1402. The coil controller 1402 and a plurality of current controllers 1403 connected thereto are provided in association with a plurality of coils 202. The coil unit 203 is connected to each current controller 1403. The current controller 1403 is able to control the magnitudes of currents to be applied to the respective coils 202 of the coil unit 203 connected to the current controller 1403.

The coil controller 1402 issues instructions for target current values to the respective current controllers 1403 connected to the coil controller 1402. The current controller 1403 controls the amounts of currents to be applied to the respective coils 202 connected to the current controller 1403.

A plurality of X-sensors 101 is connected to the sensor controller 1404 in such a way as to be able to communicate with the sensor controller 1404.

The plurality of X-sensors 101 is mounted on the stator 201 at such an interval that, even during conveyance of the mover 301, one of the plurality of X-sensors 101 is able to always or at least reliably measure the position of one mover 301.

The integrated controller 1401 determines current instruction values, which are to be applied to a plurality of coils 202, based on outputs from the X-sensors 101, and transmits the determined current instruction values to the coil controllers 1402. The coil controllers 1402 issues instructions for current values to the current controller 1403 based on the current instruction values output from the integrated controller 1401, thus performing current control. With this control, the integrated controller 1401 functions as a control device and thus performs conveyance control to move the mover 301 along the stator 201.

Figure 16:
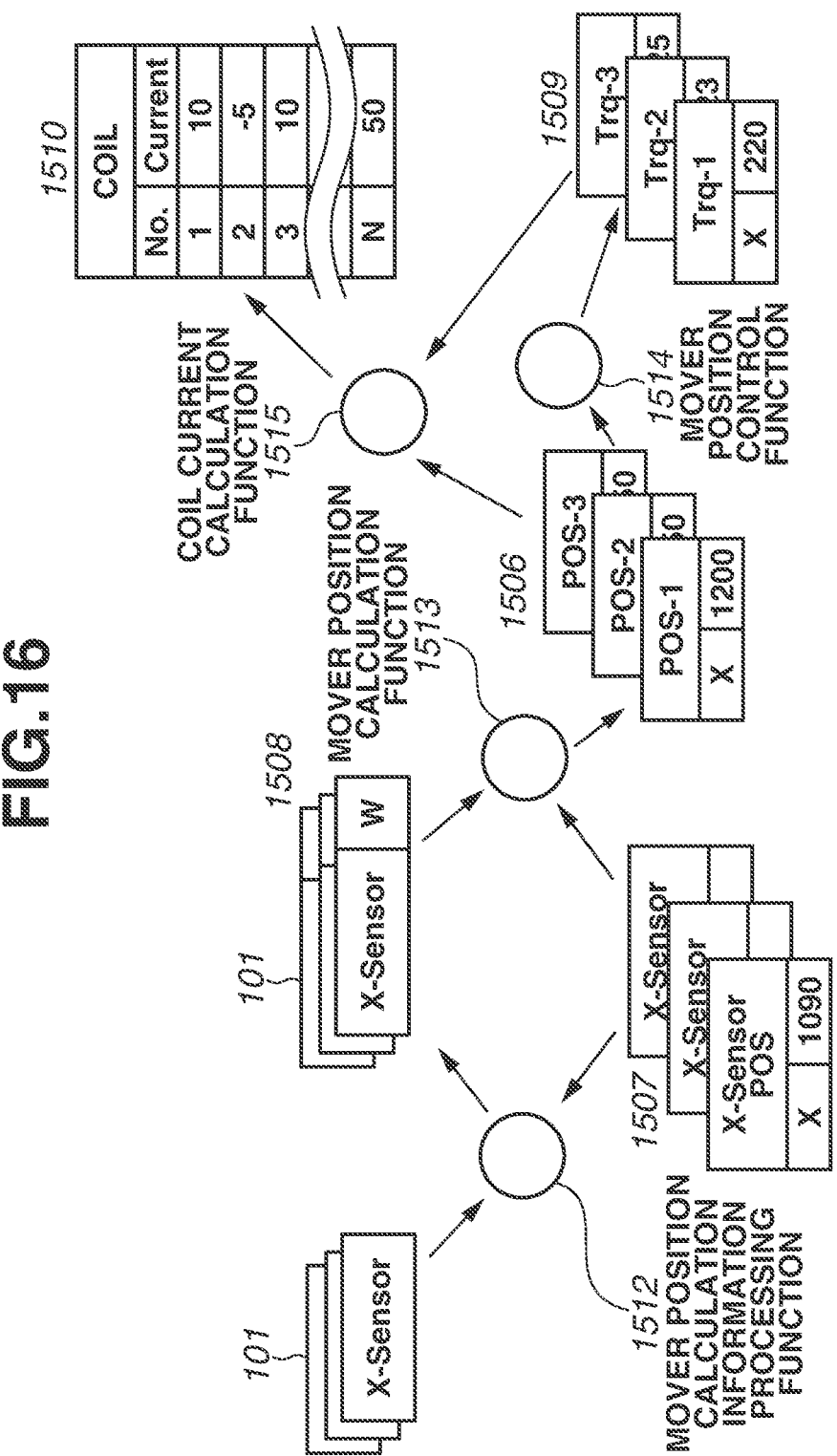
FIG. 16 is a schematic view illustrating a data flow in the second exemplary embodiment of the present disclosure.

In the following description, a position control method for the mover 301 which is performed by the integrated controller 1401 is described with reference to FIG. 16. FIG. 16 is a schematic view illustrating a control method for the mover 301 in the conveyance system 1001 according to the second exemplary embodiment. FIG. 16 illustrates the outline of a control method for the mover 301 while mainly focusing on the flow of data for the control method. As described below, the integrated controller 1401 performs processing using a mover position calculation information processing function 1512, a mover position calculation function 1513, a mover position control function 1514, and a coil current calculation function 1515. With this processing, the integrated controller 1401 controls conveyance of the mover 301 while controlling the position of the mover 301. Furthermore, instead of the integrated controller 1401, the coil controller 1402 can be configured to perform processing similar to that performed by the integrated controller 1401.

First, the mover position calculation information processing function 1512 calculates mover position calculation information 1508 from measurement values obtained from a plurality of X-sensors 101 and sensor mounting position information 1507 about the mounting positions of the respective X-sensors 101. Next, the mover position calculation function 1513 calculates the number and respective positions of movers 301 present on the stator 201, which constitutes a conveyance path, from the mover position calculation information 1508. With this calculation, the mover position calculation function 1513 updates mover position information and number-of-movers information included in mover information 1506, which is information about the mover 301. The mover position information indicates a position in the X-direction serving as the conveyance direction of the mover 301 present on the stator 201. The mover information 1506 is prepared for each of movers 301 present on the stator 201.

The mover position calculation information processing function 1512 identifies X-sensors 101 which are detecting linear scales 304 mounted on the respective movers 301, based on measurement values output from a plurality of X-sensors 101. At this time, the mover position calculation information processing function 1512 calculates coefficients (W) based on the sensor mounting position information 1507 about the identified X-sensors 101 present on the stator 201 and the measurement values output from the identified X-sensors 101.

Next, the mover position calculation function 1513 calculates position information about each mover 301 from the mover position calculation information 1508, which includes the measurement values output from the identified X-sensors 101 and the calculated coefficients (W), and the sensor mounting position information 1507, and updates the mover information 1506 with the calculated position information.

Next, the mover position control function 1514 calculates application force information 1509 with respect to each mover 301 from the current mover information 1506, including mover position information, and position target values. The application force information 1509 is information concerning the magnitude of a force which is to be applied to each mover 301. The application force information 1509 is prepared for each mover 301 present on the stator 201 as illustrated as, for example, Trq-1, Trq-2, . . . , in FIG. 16.

Next, the coil current calculation function 1515 determines current instruction values 1510, which are to be applied to the respective coils 202, based on the application force information 1509 and the mover information 1506.

In this way, the integrated controller 1401 determines the current instruction values 1510 by performing processing using the mover position calculation information processing function 1512, the mover position calculation function 1513, the mover position control function 1514, and the coil current calculation function 1515. The integrated controller 1401 transmits the determined current instruction values 1510 to the coil controllers 1402.

Figure 17:
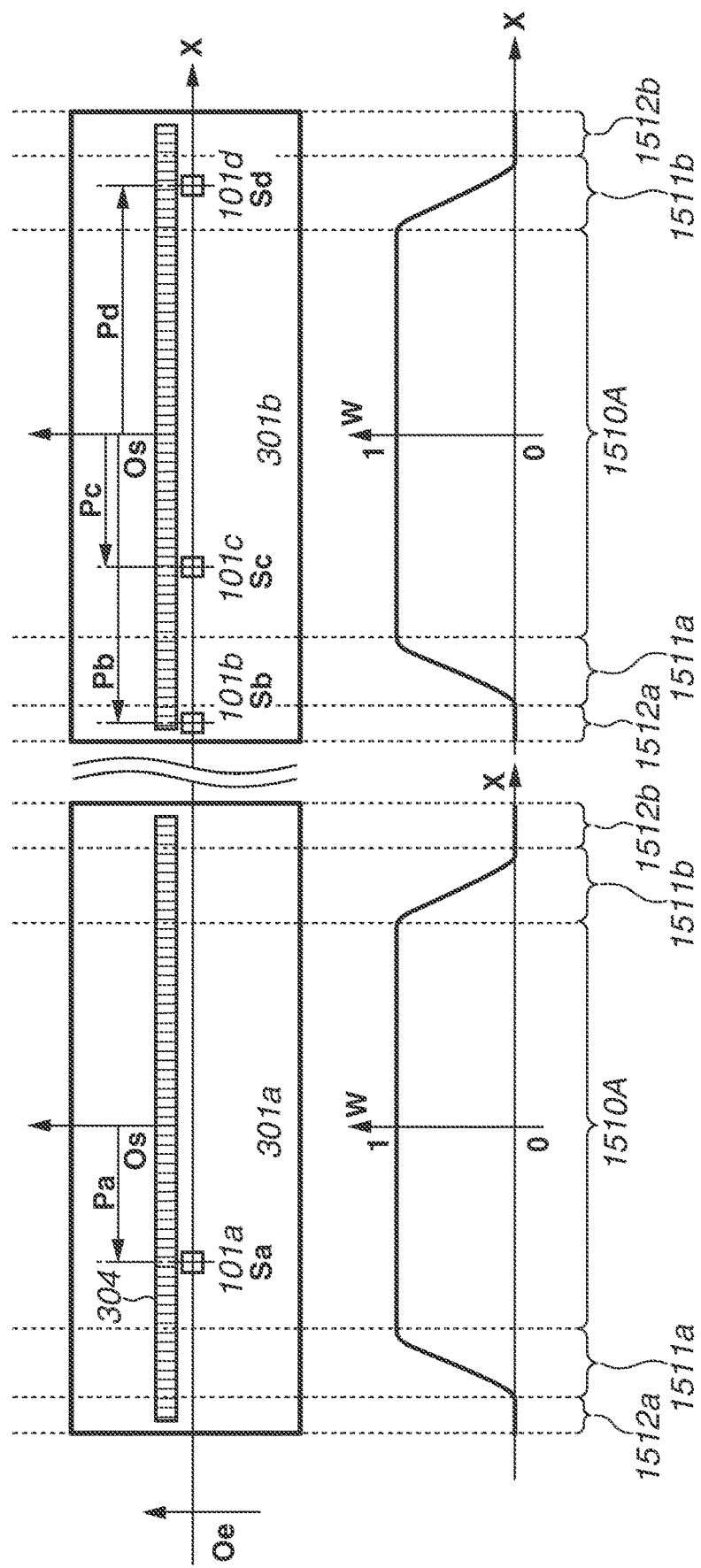
FIG. 17 is a schematic view used to explain conveyance direction position detection in the second exemplary embodiment of the present disclosure.

Here, processing which is performed by the mover position calculation information processing function 1512 is described with reference to FIG. 17. FIG. 17 is a schematic view used to explain processing which is performed by the mover position calculation information processing function 1512.

In FIG. 17, a reference point Oe is a positional reference for the stator 201, on which the X-sensors 101 are mounted. Moreover, a reference point Os is a positional reference for each of the linear scales 304 mounted on each mover 301. FIG. 17 illustrates a case where two movers 301a and 301b are conveyed as the movers 301 and four X-sensors 101a, 101b, 101c, and 101d are arranged as the X-sensors 101. Furthermore, the linear scales 304 are mounted at the respective same positions in the movers 301a and 301b along the X-direction.

The X-sensors 101a to 101d, which are observing the movers 301, calculate coefficients (W) of greater than or equal to "0" and less than or equal to "1" based on output distances Pa, Pb, Pc, and Pd.

For example, since it is determined that the X-sensors 101a and 101c illustrated in FIG. 17 are present in the sensor information effective region 1510A, the coefficients (W) are calculated as in the following formulae (27) and (28).

$$W(101a)=1 \qquad (27)$$

$$W(101c)=1 \qquad (28)$$

Moreover, since it is determined that the X-sensor 101b illustrated in FIG. 17 is present in the sensor information ineffective region 1512a, the coefficient (W) is calculated as in the following formula (29). The sensor information ineffective region 1512 is provided to disregard an output obtained in a region in which a detection error in the X-sensor 101 becomes greater than or equal to a given value due to the X-sensor 101 detecting an end of the linear scale 304.

$$W(101b)=0 \qquad (29)$$

Moreover, since it is determined that the X-sensor 101d illustrated in FIG. 17 is present in the sensor information load region 1511b, a coefficient (W) of greater than or equal to "0" and less than or equal to "1" is calculated, for example, with use of a continuous function which monotonously increases or decreases from "0" to "1" or from "1" to "0", for example, a sigmoid function such as the following formula (30). In formula (30), "a" is a gain in the sigmoid function.

$$W(101d)=1/(1+\exp(-a*Pd)) \tag{30}$$

The mover position calculation information processing function 1512 calculates coefficients (W) from outputs of the X-sensors 101 and the sensor mounting position information 1507. The mover position calculation information processing function 1512 outputs mover position calculation information 1508 with the calculated coefficients (W) added thereto, and then inputs such mover position calculation information 1508 to the mover position calculation function 1513.

Furthermore, employing a method of using another function described as an example in the first exemplary embodiment as a function which calculates coefficients (W) or a method of retaining such a function as a coefficient profile on a memory of the integrated controller 1401 allows performing processing similar to that performed by the mover position calculation information processing function 1512.

Next, processing which is performed by the mover position calculation function 1513 is described with reference to FIG. 17.

For example, one X-sensor 101a is facing the linear scale 304 of the mover 301a illustrated in FIG. 17. The X-sensor 101a reads the linear scale 304 of the mover 301a and thus outputs a distance Pa. Moreover, a position on the X-axis of the X-sensor 101a with the reference point Oe set as an origin is Sa. Accordingly, the position Pos(301a, 101a) of the mover 301a is able to be calculated with use of the output of the X-sensor 101a according to the following formula (31).

$$Pos(301a,101a)=Sa-Pa \tag{31}$$

For example, three X-sensor 101b, 101c, and 101d are facing the linear scale 304 of the mover 301b illustrated in FIG. 17. The X-sensor 101b reads the linear scale 304 of the mover 301b and thus outputs a distance Pb. Moreover, a position on the X-axis of the X-sensor 101b with the reference point Oe set as an origin is Sb. Accordingly, the position Pos(301b, 101b) on the X-axis of the mover 301b that is based on the output of the X-sensor 101b is able to be calculated according to the following formula (32).

$$Pos(301b,101b)=Sb-Pb \tag{32}$$

Moreover, similarly, the X-sensors 101c and 101d read the linear scale 304 of the mover 301b and thus output distances Pc and Pd, respectively. Moreover, positions on the X-axis of the X-sensors 101c and 101d with the reference point Oe set as an origin are Sc and Sd, respectively. Accordingly, the positions Pos(301b, 101c) and Pos(301b, 101d) on the X-axis of the mover 301b that are based on the outputs of the X-sensors 101c and 101d are able to be calculated according to the following formulae (33) and (34).

$$Pos(301b,101c)=Sc-Pc \tag{33}$$

$$Pos(301b,101d)=Sd-Pd \tag{34}$$

Here, since the respective mounting positions of the X-sensors 101b, 101c, and 101d are previously measured in an accurate way, a difference between the three values Pos(301b, 101b), Pos(301b, 101c), and Pos(301b, 101d) is sufficiently small with respect to the length of the mover 301. In this way, in a case where a difference between positions on the X-axis of the mover 301 that are based on outputs of a plurality of X-sensors 101 is sufficiently small, it can be determined that such a plurality of X-sensors 101 is observing the linear scale 304 of one and the same mover 301.

Next, the mover position calculation function 1513 calculates a weighted average based on the positions Pos(301, 101) on the X-axis of the mover 301, which are calculated based on the outputs of the X-sensors 101 determined to be observing one and the same mover 301, and the mover position calculation information 1508, and uniquely determines the position of the mover 301 based on the calculated weighted average.

For example, the position Pos(301a) of the mover 301a illustrated in FIG. 17 is calculated with use of the following formula (35).

$$Pos(301a)=W(101a)*Pos(301a,101a)/W(101a) \tag{35}$$

Alternatively, from the viewpoint of a calculation error, in a case where only one X-sensor 101 is observing one and the same mover 301, the following formula (36) can also be used.

$$Pos(301a)=Pos(301a,101a) \tag{36}$$

Next, for example, the position Pos(301b) of the mover 301b illustrated in FIG. 17 is calculated with use of the following formula (37).

$$Pos(301b)=\{W(101b)*Pos(301b,101b)+W(101c)*Pos(301b,101c)+W(101d)*Pos(301b,101d)\}/\{W(101b)+W(101c)+W(101d)\} \tag{37}$$

Next, the mover position control function 1514 calculates application force information 1509 about each mover 301 from the current mover information 1506 and a target value (instruction position). The application force information 1509 is information about the magnitude of a force which is to be applied to each mover 301.

Next, the coil current calculation function 1515 determines current instruction values 1510, which are to be applied to the respective coils 202, based on the application force information 1509 and the mover information 1506.

Next, processing which is performed by the coil current calculation function 1515 is described with reference to FIGS. 20A, 20B, and 20C. Furthermore, with regard to expression of forces which are used in the following description, directions in which forces in the X-direction and the Y-direction act are represented by "x" and "y", respectively.

Figure 21A:
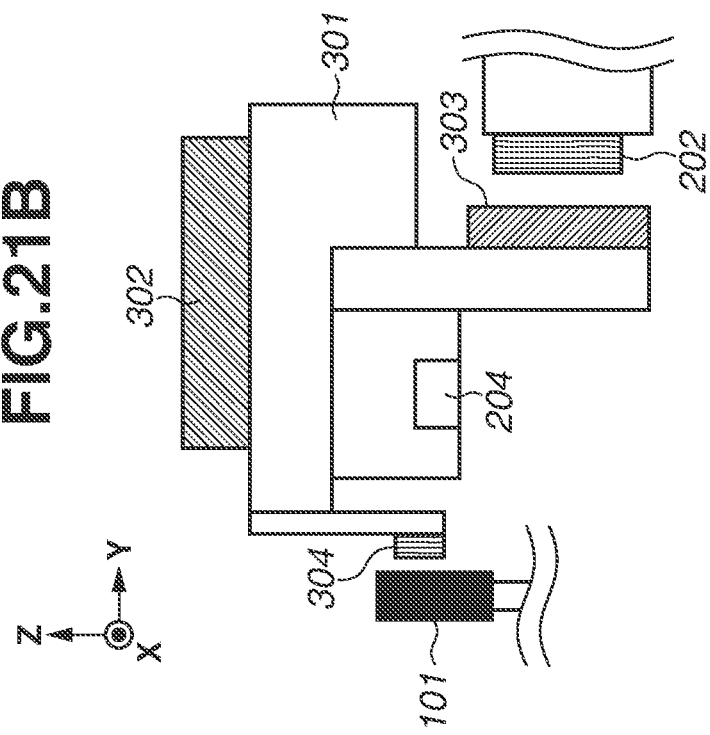
FIGS. 21A and 21B are schematic views illustrating the conveyance system according to the second exemplary embodiment of the present disclosure.

In FIG. 21A, forces which act on the respective permanent magnets 303 are expressed as follows. The forces which act on the respective permanent magnets 303 are electromagnetic forces which the permanent magnets 303 receive from a plurality of coils 202 to which currents have been applied. The permanent magnets 303 receive, in addition to electromagnetic forces Fx acting in the X-direction, which is the conveyance direction of the mover 301, electromagnetic forces Fy acting in the Y-direction from a plurality of coils 202 to which currents have been applied.

A method of applying forces in the X-direction to permanent magnets 303, the polarities of S pole and N pole of which are alternately arranged side by side in the X-direction, is described. FIGS. 20A to 20C are schematic views used to explain a method of applying forces in the X-direction to the permanent magnets 303. The coil current calculation function 1515 determines current instruction values which are to be applied to the coils 202 so as to apply forces in the X-direction to the permanent magnets 303, according to the following method.

Suppose that, when X is the position of the mover 301 and "j" is a number of each of the coils 202 arranged in line, the magnitudes of forces acting in the X-direction and the Y-direction of the coil 202(j) per unit current are denoted by Fx(j, X) and Fy(j, X), respectively. Moreover, suppose that the magnitude of a current to be applied to the coil 202(j) is denoted by i(j). Furthermore, the coil 202(j) is the j-th coil 202.

Figure 20A:
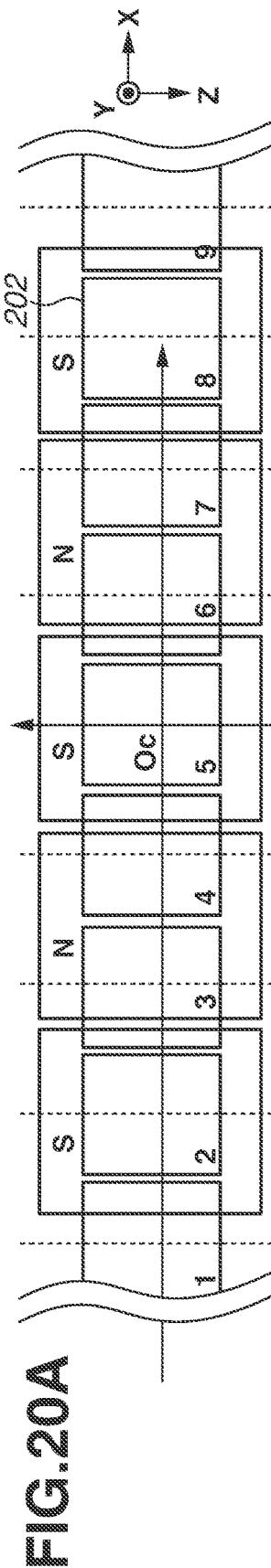
FIGS. 20A, 20B, and 20C are schematic views used to explain the second exemplary embodiment of the present disclosure.
Figure 20B:
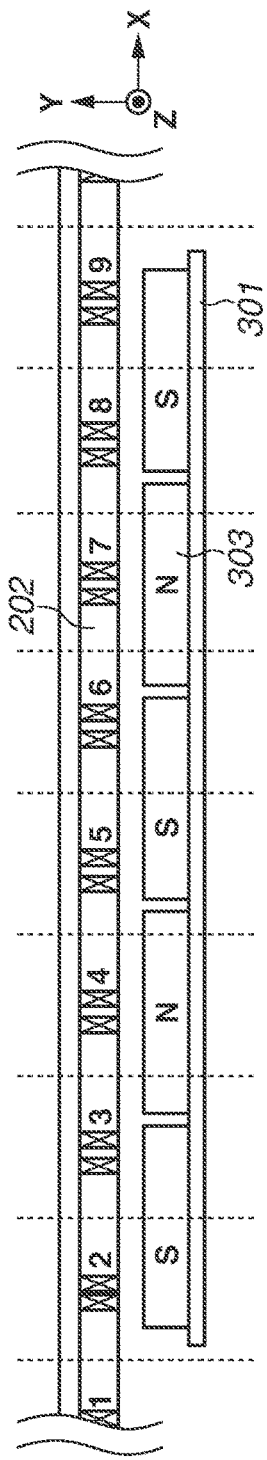

FIG. 20A is a diagram illustrating, with the X-axis set as the horizontal axis and the Z-axis set as the vertical axis, nine coils 202 facing the permanent magnets 303 in an extracted manner FIG. 20B is a diagram of such nine coils 202 facing the permanent magnets 303 as viewed from the Z-direction in FIG. 20A. The coils 202 are assigned the respective numbers "j" from "1" to "6" in the order of side-by-side arrangement in the X-direction, and, in the following description, each coil 202 is identified by being expressed as, for example, "coil 202(1)".

As illustrated in FIGS. 20A and 20B, the coils 202 are arranged at a pitch of distance L. On the other hand, the permanent magnets 303 of the mover 301 are arranged at a pitch of distance "3/2*L".

Figure 20C:
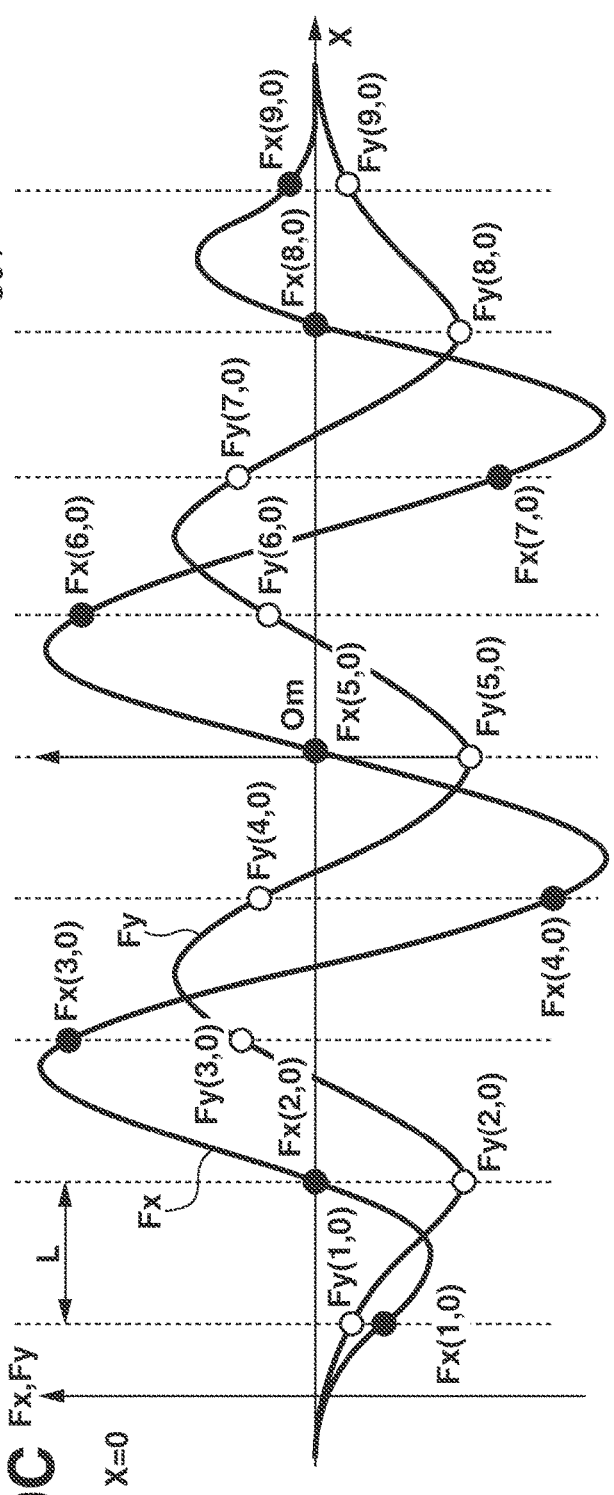

FIG. 20C is a graph schematically illustrating the magnitudes of a force Fx in the X-direction and a force Fy in the Y-direction occurring when unit currents are applied to the respective coils 202 illustrated in FIGS. 20A and 20B.

For ease of explanation, in FIGS. 20A to 20C, the origin Oc of positions in the X-direction of the coils 202 is set at the center of the coil 202(5), and the center Om in the X-direction of the permanent magnets 303 is set as the origin. Therefore, FIGS. 20A to 20C illustrate a case where the origin Oc and the center Om coincide with each other, i.e., the case of X=0.

At this time, for example, the magnitudes of forces per unit current acting on the coil 202(4) are Fx(4, 0) in the X-direction and Fy(4, 0) in the Y-direction. Moreover, the magnitudes of forces per unit current acting on the coil 202(5) are Fx(5, 0) in the X-direction and Fy(5, 0) in the Y-direction.

Here, suppose that current values to be applied to the coils 202(1) to 202(9) are denoted by i(1) to i(9), respectively. Then, the magnitude Fx of a force acting in the X-direction and the magnitude Fy of a force acting in the Y-direction on the permanent magnets 303 are generally expressed by the following formulae (38) and (39), respectively.

$$Fx=\Sigma\{Fx(j,X)*i(j)\}, (j=1, \ldots ,9) \quad (38)$$

$$Fy=\Sigma\{Fy(j,X)*i(j)\}, (j=1, \ldots ,9) \quad (39)$$

Determining current instruction values in such way as to apply the current values i(1) to i(9) satisfying the above-mentioned formulae (38) and (39) to the coils 202(1) to 202(9), respectively, allowing applying forces in the X-direction and the Y-direction to the permanent magnets 303. The coil current calculation function 1515 is able to determine current instruction values, which are to be applied to the coils 202(j), in the above-described way to apply forces in the X-direction and the Y-direction to the permanent magnets 303.

For more ease of explanation, in the situation illustrated in FIGS. 20A to 20C, consider, for example, the case of using only the coils 202(3), 202(4), and 202(5) out of the coils 202(1) to 202(9) with respect to the permanent magnets 303 and performing control in such a manner that the sum of current values to be applied to such three coils become "0". In the case of this example, the magnitude Fx of a force acting in the X-direction and the magnitude Fy of a force acting in the Y-direction on the permanent magnets 303 are expressed by the following formulae (40) and (41), respectively.

$$Fx=Fx(3,X)*i(3)+Fx(4,X)*i(4)+Fx(5,X)*i(5) \quad (40)$$

$$Fy=Fy(3,X)*i(3)+Fy(4,X)*i(4)+Fy(5,X)*i(5) \quad (41)$$

Moreover, current values to be applied to the coils 202(1) to 202(9) can be set in such a way as to satisfy the following formulae (42) and (43).

$$i(3)+i(4)+i(5)=0 \quad (42)$$

$$i(1)=i(2)=i(6)=i(7)=i(8)=i(9)=0 \quad (43)$$

Figure 21B:
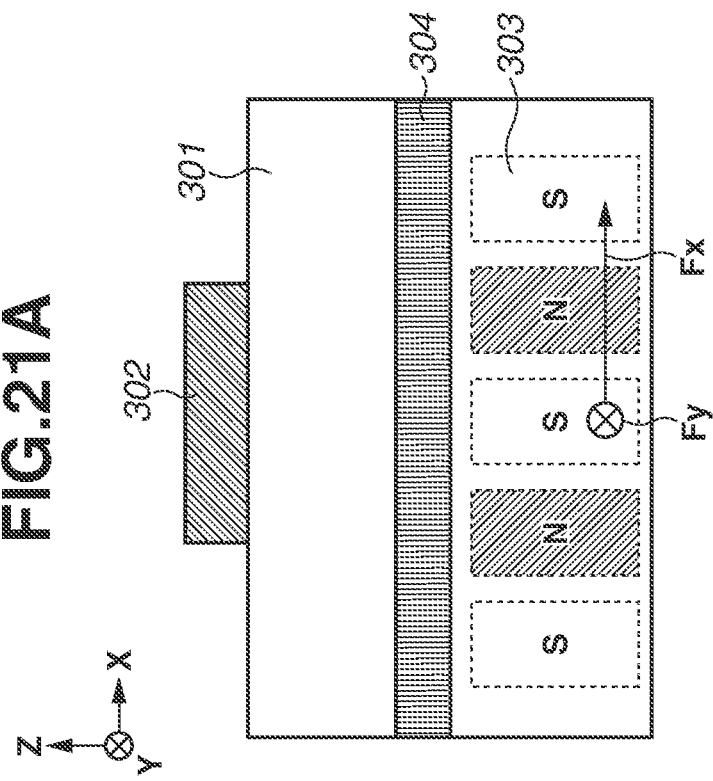

Moreover, while, as illustrated in FIG. 21B, the mover 301 is restricted by the guide rail 204 from moving in the Y-direction, it is desirable that the mover 301 be conveyed without putting an unnecessary load. Therefore, it is desirable that the magnitude Fy of a force acting in the Y-direction on the permanent magnets 303 be set in such a way as to satisfy the following formula (44).

$$Fy=0 \quad (44)$$

Accordingly, in a case where the magnitude Fx of a force required to act on the permanent magnets 303 has been determined, it is possible to uniquely determine the current values i(1) to i(9). The current instruction values determined in the above-described way cause a force in the X-direction to be applied to the mover 301. The force in the X-direction applied to the mover 301 causes the mover 301 to receive a driving force for movement in the X-direction and thus be controlled to be conveyed in the X-direction.

In this way, the integrated controller 1401 controls currents which are to be applied to a plurality of coils 202 and thus controls a force in the X-direction to be applied to the mover 301.

Furthermore, in a case where the center Oc of the coils 202 has moved relative to the center Om of the permanent magnet 303bR due to conveyance of the mover 301, i.e., in the case of X≠0, it is possible to select coils 202 corresponding to the moved position. Additionally, it is possible to perform a calculation similar to that described above based on a force per unit current occurring at each coil 202.

In the above-described way, the integrated controller 1401 determines current instruction values for currents which are to be applied to a plurality of coils 202 and performs control based on the determined current instruction values, thus controlling conveyance of the mover 301 on the stator 201. Thus, the integrated controller 1401 functions as a conveyance control unit which controls conveyance of the mover 301, and controls conveyance of the mover 301 on the stator 201 by controlling electromagnetic forces which the permanent magnets 303 receive from a plurality of coils 202. Furthermore, the whole or a part of the functions of the integrated controller 1401 serving as a control device can be replaced with another control device such as the coil controller 1402.

Figure 18:
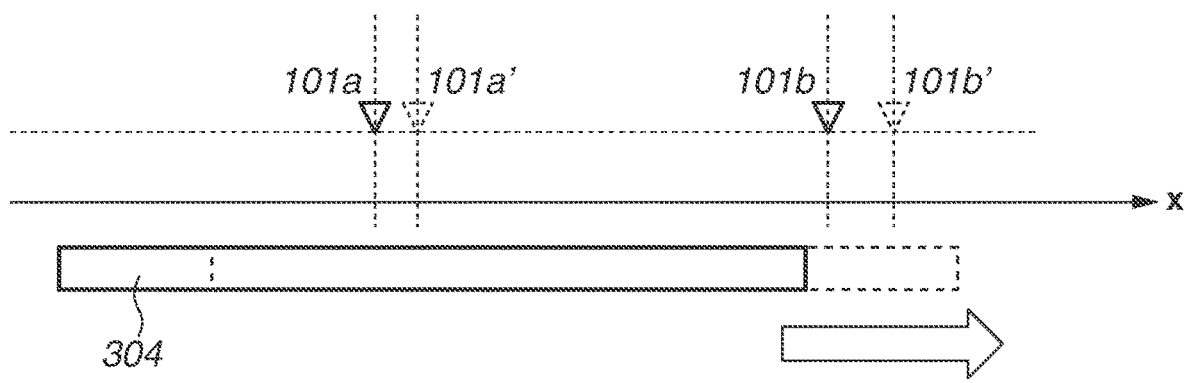
FIG. 18 is a schematic view used to explain advantageous or beneficial effects of the second exemplary embodiment of the present disclosure.
Figure 19:
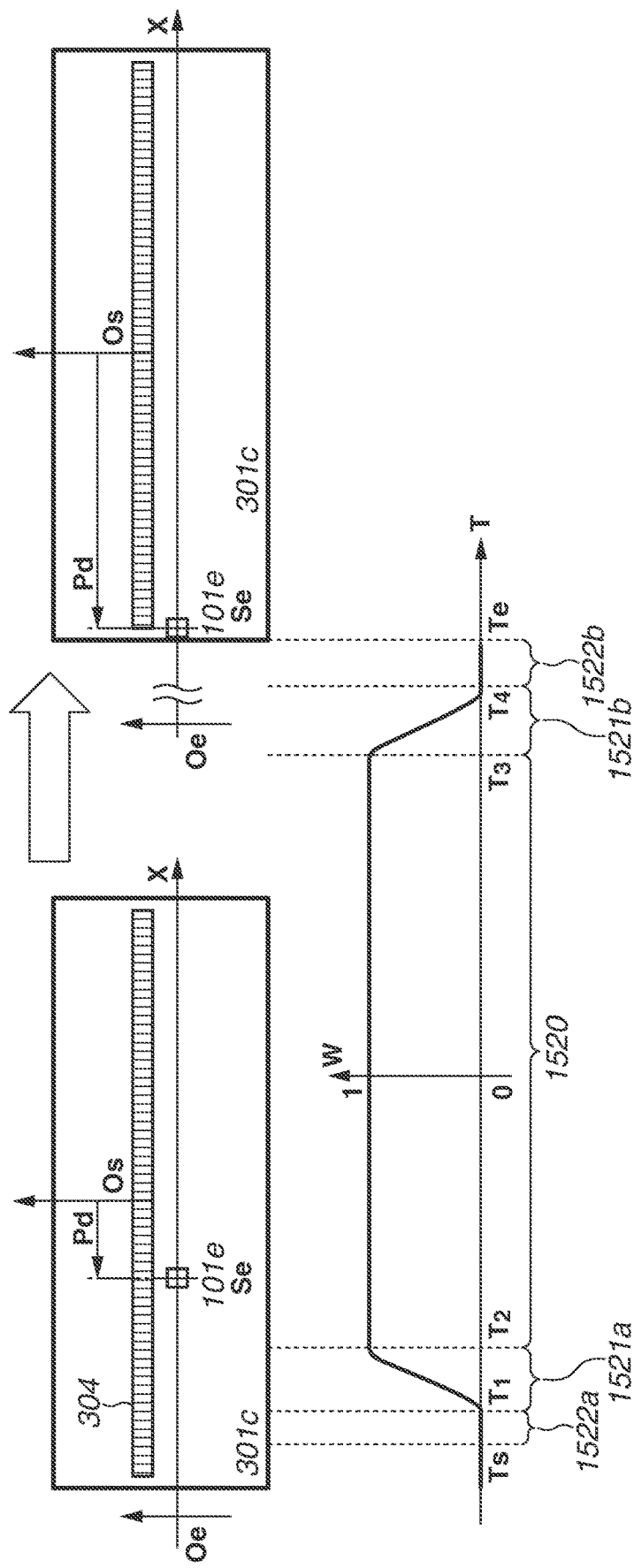
FIG. 19 is a schematic view used to explain advantageous or beneficial effects of the second exemplary embodiment of the present disclosure.

Next, advantageous or beneficial effects of the second exemplary embodiment are described with use of an example of detection using the X-sensors 101 illustrated in FIG. 18 and FIG. 19.

FIG. 18 illustrates a manner in which, along with the mover 301 (not illustrated) being conveyed, the linear scale 304 mounted on the mover 301 is moving, and a plurality of X-sensors 101a and 101b differ in sensor mounting position due to variations in sensor mounting accuracy. In FIG. 18, design-based mounting positions of X-sensors 101 are schematically represented as X-sensors 101a' and 101b', and actual mounting positions of X-sensors 101 are schematically represented as X-sensors 101a and 101b.

As illustrated in FIG. 18, along with the mover 301 being conveyed, the X-sensor 101b starts to detect the linear scale 304 anew. It is desirable that the detected position and orientation obtained when detection sensors are switched be detected without errors regardless of switching of the X-sensors 101 from the viewpoint of prevention or reduction of vibrations of the mover 301. However, as mentioned above, due to, for example, sensor mounting accuracy or mechanical error, detection errors may occur.

In a conventional technique, due to switching of X-sensors 101, a result of detection of mover position information may greatly vary in a discontinuous manner. On the other hand, a result of detection of mover position information obtained with use of coefficients (W) varies in a continuous manner, so that it is possible to reduce a variation of the detection position caused by switching of the X-sensors 101 to a small one.

Furthermore, sensors which are used for calculation of the mover information 1506 are switched one after another along with conveyance of the mover 301. At that time, the mounting positions of sensors serially change in the order of the sensor information ineffective region 1512b, the sensor information load region 1511b, the sensor information effective region 1510A, the sensor information load region 1511a, and the sensor information ineffective region 1512a along with the coefficients (W). Therefore, according to the second exemplary embodiment, it is possible to reduce a variation of the detected position, which is obtained when detection sensors are switched, to a small one. Accordingly, it becomes possible to remove vibrations of the mover caused by switching of the detection sensors and to perform stable conveyance of the mover.

Moreover, calculation processing for mover position information about the mover 301 which is performed in the first exemplary embodiment by the mover position calculation function 501 illustrated in FIG. 4 can be replaced by the mover position calculation information processing function 1512 and the mover position calculation function 1513 in the second exemplary embodiment. With this replacement, even in the calculation processing for mover position information in the first exemplary embodiment, it is possible to remove vibrations of the mover caused by switching of the detection sensors in the first direction.

Moreover, while, in the second exemplary embodiment, the coefficients (W), which are calculated by the mover position calculation information processing function 1512, are calculated based on a relative position of the mover 301 and the X-sensor 101 (calculated from the output of the X-sensor 101 and the mounting position thereof), a method of calculating coefficients (W) according to a detection time during which the X-sensor 101 is performing detection can be employed. According to such a method described below, regardless of the movement speed of the mover 301, it is possible to remove vibrations of the mover caused by switching of the detection sensors and to perform stable conveyance of the mover. In this example in which the positional information of the mover 301 is corrected according to the detection time detected by the X-sensor 101, information on the relative position of the mover 301 and the X-sensor 101 can be added.

For example, along with the mover 301c being conveyed, the X-sensor 101e illustrated in FIG. 19 starts to detect the mover 301c at time Ts and then ceases to detect the mover 301c at time Te.

For example, with regard to the X-sensor 101e illustrated in FIG. 19, since each of a period from time Ts to time T1 and a period from time T4 to time Te is determined to be a sensor information ineffective time 1522, the coefficient (W) is calculated as in the following formula (45).

$$W(101e,t)=0, (Ts<t<T1, T4<t<Te) \quad (45)$$

Moreover, with regard to the X-sensor 101e illustrated in FIG. 19, since a period from time T2 to time T3 is determined to be a sensor information effective time 1520, the coefficient (W) is calculated as in the following formula (46).

$$W(101e,t)=1, (T2<t<T3) \quad (46)$$

Moreover, with regard to the X-sensor 101e illustrated in FIG. 19, each of a period from time T1 to time T2 and a period from time T3 to time T4 is determined to be a sensor information load time 1521. Therefore, for example, a coefficient (W) of greater than or equal to "0" and less than or equal to "1" is calculated, for example, with use of a continuous function which monotonously increases or decreases from "0" to "1" or from "1" to "0", for example, a sigmoid function such as the following formulae (47) and (48). In formulae (47) and (48), "a" is a gain in the sigmoid function.

$$W(101e,t)=1/\{1+\exp(-a^*(t-t1'))\}, (T1 \le t<T2, t1'=(T2-T1)/2) \quad (47)$$

$$W(101e,t)=1-1/\{1+\exp(-a^*(t-t2'))\}, (T3<t \le T4, t2'=(T4-T3)/2) \quad (48)$$

The mover position calculation information processing function 1512 can be configured to calculate the coefficients (W) based on detection times during which the X-sensor 101 is performing detection in the above-described way. The mover position calculation information processing function 1512 outputs mover position calculation information 1508 with the calculated coefficients (W) added thereto and inputs such mover position calculation information 1508 to the mover position calculation function 1513.

Furthermore, the time Te at which the X-sensor 101e ceases to detect the mover 301c can be determined according to the movement state of the mover 301c.

For example, in a case where the mover 301c illustrated in FIG. 19 is being conveyed at a predetermined speed Vc, the detection ending time Te is determined as in the following formula (49). In formula (49), Lc is the length of the linear scale 304 mounted on the mover 301c.

$$Te=Ts+Lc/Vc \quad (49)$$

Moreover, in a case where, when the X-sensor 101 is detecting the mover 301, for example, the mover 301 has stopped, adding a period of stoppage thereof and an acceleration or deceleration time thereof allows appropriately and correctly determining the detection ending time Te.

Performing position control of the mover using the mover position calculation information 1508 to which the coefficients (W) calculated in the above-described way have been added allows reducing a variation of the detected position, which is obtained when detection sensors are switched, to a small one.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-019511, filed Feb. 7, 2020, and No. 2020-203785, filed Dec. 8, 2020, which are hereby incorporated by reference herein in their entirety.

What is claimed is:

1. A conveyance apparatus comprising:
a mover configured to move along a first direction;
a stator including a plurality of first sensors arranged along the first direction, wherein each of the plurality of first sensors is configured to detect position information about the mover; and
a control unit configured to control a position and/or orientation of the mover,
wherein the control unit controls each of the plurality of first sensors to obtain a plurality of relative positions to different portions of the mover,
wherein the control unit corrects the position information about the mover based on the plurality of obtained relative positions,
wherein the control unit adjusts at least one of a plurality of detection values output from the plurality of first sensors by using coefficients and corrects the position information about the mover,
wherein detection target regions set on the mover include a first region which is set at a middle portion, second regions which are set at end portions in the first direction, and third regions which are between the first region and the second regions, and
wherein the coefficients are plural, and a coefficient set for the second regions or the third regions is smaller than a coefficient set for the first region.

2. The conveyance apparatus according to claim 1, wherein the coefficients that the control unit uses differ depending on a region among the first region, the second regions, and the third regions in which at least one first sensor of the plurality of first sensors is present.

3. A production system comprising:
the conveyance apparatus according to claim 1; and
a production apparatus configured to perform processing on work which moves by being conveyed by the conveyance apparatus.

4. A method for manufacturing an article, the method comprising manufacturing the article using a production system having the conveyance apparatus according to claim 1 and a production apparatus,
wherein the production apparatus is configured to perform processing on work which moves by being conveyed by the conveyance apparatus.

5. The conveyance apparatus according to claim 1, wherein the plurality of obtained relative positions are based on detection times in which at least one of the plurality of first sensors detects the position information about the mover.

6. A production system comprising:
the conveyance apparatus according to claim 1, wherein the plurality of obtained relative positions are based on detection times in which at least one of the plurality of first sensors detects the position information about the mover; and
a production apparatus configured to perform processing on work which moves by being conveyed by the conveyance apparatus.

7. A method for manufacturing an article, the method comprising manufacturing the article using a production system having the conveyance apparatus according to claim 1 and a production apparatus,
wherein the plurality of obtained relative positions are based on detection times in which at least one of the plurality of first sensors detects the position information about the mover, and
wherein the production apparatus is configured to perform processing on work which moves by being conveyed by the conveyance apparatus.

8. A conveyance apparatus comprising:
a mover configured to move along a first direction;
a stator including a plurality of first sensors arranged along the first direction, wherein each of the plurality of first sensors is configured to detect position information about the mover in the first direction, and including a plurality of second sensors, each configured to detect position information about the mover in a second direction intersecting with the first direction; and
a control unit configured to (i) select at least one of the plurality of second sensors by using detection values output from the plurality of first sensors, (ii) correct the position information about the mover in the second direction based on a relative position between the selected second sensor and the mover, and (iii) control a position and/or orientation of the mover.

9. The conveyance apparatus according to claim 8, wherein the control unit adjusts at least one of a plurality of detection values output from the plurality of second sensors by using coefficients and corrects the position information about the mover in the second direction.

10. The conveyance apparatus according to claim 9, wherein detection target regions set on the mover include a first region which is set at a middle portion, second regions which are set at end portions in the first direction, and third regions which are between the first region and the second regions, and wherein the coefficients that the control unit uses differ depending on a region among the first region, the second regions, and the third regions in which at least one second sensor of the plurality of second sensors is present.

11. The conveyance apparatus according to claim 10, wherein the coefficients are plural, and a coefficient set for the second region or the third region is smaller than a coefficient set for the first region.

12. The conveyance apparatus according to claim 10, wherein a distance between adjacent two second sensors of the plurality of second sensors is less than or equal to one half of a length of the first region of the mover in the first direction.

13. The conveyance apparatus according to claim 8, wherein the stator further includes a plurality of third sensors, each configured to detect position information about the mover in a third direction intersecting with the first direction and the second direction, and
wherein the control unit (i) selects at least one of the plurality of third sensors by using detection values output from the plurality of first sensors, (ii) corrects the position information about the mover in the third direction based on a relative position between the selected third sensor and the mover, and (iii) controls a position and/or orientation of the mover.

14. The conveyance apparatus according to claim 13, wherein the control unit adjusts at least one of a plurality of detection values output from the plurality of third sensors by using coefficients and corrects the position information about the mover in the third direction.

15. The conveyance apparatus according to claim 8, wherein the mover includes a first magnet group including a plurality of magnets arranged along the first direction, and a second magnet group including a plurality of magnets arranged along the second direction intersecting with the first direction, and
wherein the stator includes a plurality of coils arranged along the first direction in such a way as to be able to face the first magnet group and the second magnet group.

16. The conveyance apparatus according to claim 15, wherein the mover is controlled with respect to movement in the first direction by the first magnet group and the plurality of coils, and is controlled with respect to position in the second direction intersecting with the first direction by the second magnet group and the plurality of coils.

17. A production system comprising:
the conveyance apparatus according to claim 8; and
a production apparatus configured to perform processing on work which moves by being conveyed by the conveyance apparatus.

18. A method for manufacturing an article, the method comprising manufacturing the article using a production system having the conveyance apparatus according to claim 8 and a production apparatus,
wherein the production apparatus is configured to perform processing on work which moves by being conveyed by the conveyance apparatus.

* * * * *